(12) United States Patent
Heidenfeldt et al.

(10) Patent No.: US 12,360,597 B2
(45) Date of Patent: Jul. 15, 2025

(54) COMPUTING DEVICE

(71) Applicant: Lenovo (Singapore) Pte. Ltd., Singapore (SG)

(72) Inventors: Mark Christopher Heidenfeldt, Apex, NC (US); Justin Michael Ringuetta, Morrisville, NC (US); Mark K. Summerville, Apex, NC (US); Richard Todd. Wall, Clayton, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/665,516

(22) Filed: Feb. 5, 2022

(65) Prior Publication Data
US 2023/0273683 A1    Aug. 31, 2023

(51) Int. Cl.
*G06F 3/16* (2006.01)
*G06F 3/01* (2006.01)
*G06F 3/044* (2006.01)

(52) U.S. Cl.
CPC ............ *G06F 3/016* (2013.01); *G06F 3/0446* (2019.05)

(58) Field of Classification Search
None
See application file for complete search history.

(56) References Cited

U.S. PATENT DOCUMENTS

| | | | | |
|---|---|---|---|---|
| 2004/0155871 | A1* | 8/2004 | Perski | G06F 3/041 345/174 |
| 2019/0306401 | A1* | 10/2019 | Toriumi | G10L 15/22 |
| 2020/0246977 | A1* | 8/2020 | Swietojanski | G06F 3/167 |
| 2020/0401087 | A1* | 12/2020 | Mun | H04R 1/08 |

* cited by examiner

*Primary Examiner* — Carl Adams
(74) *Attorney, Agent, or Firm* — Brian J. Pangrle

(57) ABSTRACT

A method can include receiving vibration signals responsive to an object contacting a location on a housing of a computing device; analyzing the vibration signals to determine the location; associating the location with a predetermined value; and transmitting the predetermined value.

20 Claims, 15 Drawing Sheets

COMPUTING DEVICE

TECHNICAL FIELD

Subject matter disclosed herein generally relates to technology for computing devices, computing systems or other systems.

BACKGROUND

Various types of computing devices exist that include a display as set in a display housing.

SUMMARY

A method can include receiving vibration signals responsive to an object contacting a location on a housing of a computing device; analyzing the vibration signals to determine the location; associating the location with a predetermined value; and transmitting the predetermined value. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
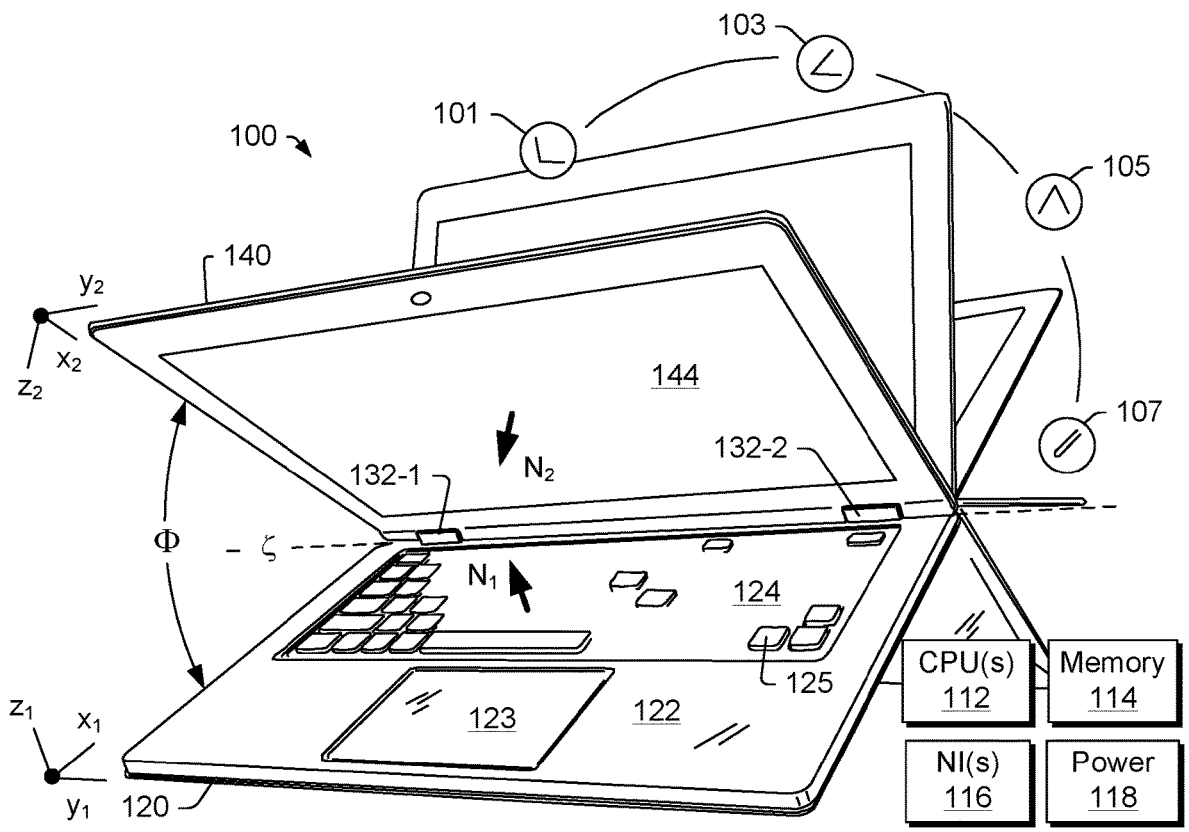
FIG. 1 is a diagram of an example of a device.
Figure 1:
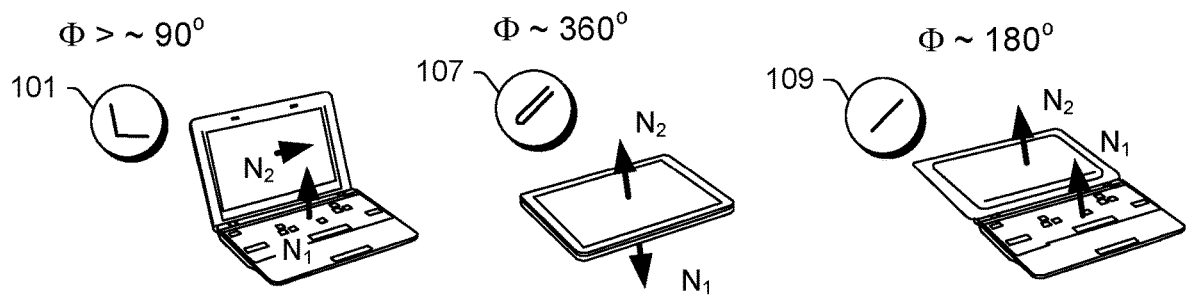

FIG. 1 shows an example of a device 100 that includes a keyboard housing 120 and a display housing 140 that are pivotable with respect to each other via movement about one or more hinges 132-1 and 132-2 (e.g., hinge assemblies). The device 100 may be a system such as, for example, a computing system (e.g., an information handling device, etc.).

As an example, the device 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the device 100, the keys 125 may be contacted by the users hand or hands. A user may perceive the springiness of the keys 125 as being somewhat undesirable. For example, springy keys may interfere with a user's ability to comprehend or sense force that is sufficient to grasp the device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis ζ)and then rotate the keyboard housing such that the keys face the back side of the display in a folded orientation. In such an example, a single centrally located hinge provides symmetry such that a computing device can be aligned in a clamshell closed orientation and a tablet orientation, optionally with the keys of the keyboard housing facing the back side of a display of a display housing. In such an example, the back side of the keyboard housing can be facing outwardly, which may provide a surface for interactions, for example, in addition to or alternative to the back side of the display housing.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing devices such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate devices shown in FIG. 1.

Figure 2:
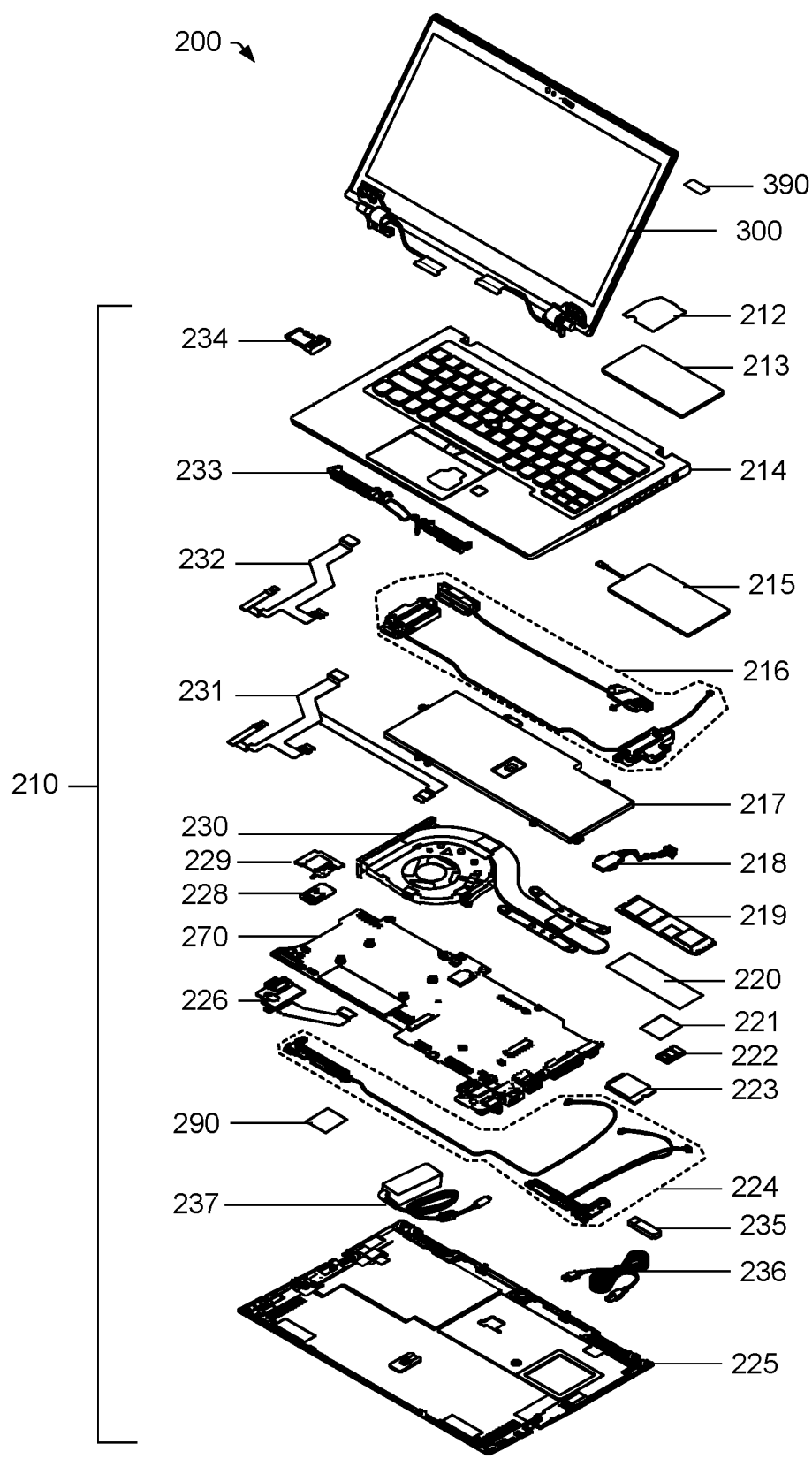
FIG. 2 is a diagram of an example of a device.

FIG. 2 shows an exploded perspective view of a computing device 200 as including various components, which can include, for example, components of a keyboard assembly 210 and components of a display assembly 300. As shown in the example of FIG. 2, the keyboard assembly 210 can include insulation trackpad tape 212, a trackpad 213 or 215, a keyboard bezel assembly with keyboard 214, a speaker kit 216, a built-in battery 217, a coin-cell battery 218, a solid-state drive 219, a thermal pad 220, NFC module foam 221, a NFC module 222, a wireless-WAN card 223, a wireless-WAN antenna assembly 224, a base cover assembly 225, a USB and power board 226, a system board 270, a fingerprint reader module 228, a fingerprint reader bracket 229, a thermal fan assembly 230, a trackpad and fingerprint reader cable 231 or 232, a wireless-LAN antenna assembly 233, a SIM-card tray 234, a recovery USB 235, a power cord 236, and an AC power adapter 237.

Figure 3:
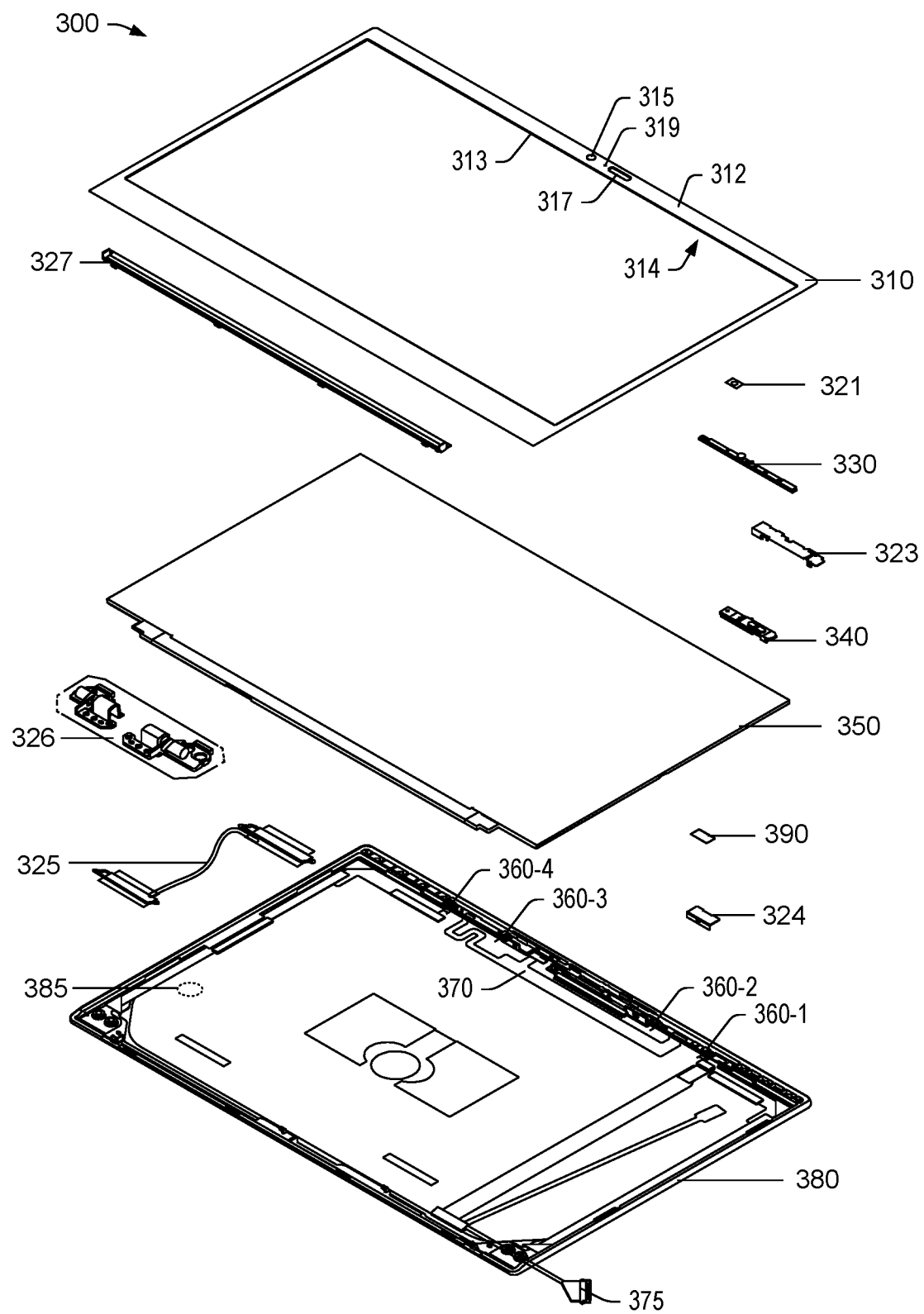
FIG. 3 is a diagram of an example of a display assembly of the device of FIG. 2.

FIG. 3 shows an exploded perspective view of the display assembly 300 of FIG. 2 as including various components, which can include, for example, a bezel 310, a foam component for an IR LED camera 321, a camera module 330, a stopper 323, a shutter 340, a display panel 350, a support plate 324, one or more microphones 360, wiring 370, one or more wiring connectors 375, a back side (rear) cover assembly 380, a display cable 325, hinges 326, and a display bezel frame component 327. In the example of FIG. 3, a circuit 385 is shown, which can be a LED circuit where illumination from one or more LEDs of the display assembly 300 can be visible on the back side cover assembly 380.

In the example of FIG. 2 and FIG. 3, the computing device 200 can include one or more motion sensors. For example, consider one or more motion sensors 290 within the keyboard assembly 210 and/or one or more motion sensors 390 within the display assembly 300.

In the example of FIG. 2 and FIG. 3, the computing device 200 can include various media capture components. For example, a camera can be a media capture component, a microphone can be a media capture component, etc. A media capture component may be an audio media capture component, a video media capture component, a still image media capture component, etc.

As an example, a media capture component can be operatively coupled to appropriate circuitry of a computing device. For example, consider audio circuitry, which may be present as an audio chip, an audio card, integrated audio circuitry, etc. As an example of integrated audio circuitry, consider INTEL high definition (HD) audio, which provides circuitry capable of delivering support and sound quality for up to eight channels at 192 kHz/32-bit quality. As an example, audio circuitry may provide for 15 input and 15 output streams, 16 pulse code modulation (PCM) audio channels per stream, sample resolutions of 8-32 bits, sample rates of 6-192 kHz, support for audio codecs (e.g., ADC, DAC), modem codecs, and vendor-defined codecs, discoverable codec architecture, fine-grained codec power-control, audio jack detection, sensing, and retasking, etc. As an example, circuitry can include digital signal processing (DSP) circuitry.

As an example, circuitry may include one or more features of the INTEL smart sound technology (SST), for example, as described in the INTEL Smart Sound Technology NHLT Specification (January 2020, Revision 0.8.1), which is incorporated by reference herein ("NHLT Specification"). The NHLT Specification describes various microphone configurations, including number of microphones and location of microphones, which may be referred to at times as microphone arrays. In the NHLT Specification, a plane of a housing is defined using y and z coordinates while an x coordinate can be normal to the plane (noting that in the example of FIG. 1, a plane may be defined in x and y with z being normal to the plane). In the NHLT Specification, a SPECIFIC_CONFIG structure can be defined for microphone arrays. For example, consider the following: linear 2-element, small; linear 2-element, big; linear 4-element, $1^{st}$ geometry; planar L-shaped 4-element; linear 4-element, $2^{nd}$ geometry; and vendor defined. As to vendor defined, consider the following example:

```
ypedefstruct_VENDOR_MIC_CONFIG
{
BYTE Type;
BYTE Panel;
WORD SpeakerPositionDistance; // mm
WORD HorizontalOffset; // mm
WORD VerticalOffset; // mm
BYTE FrequencyLowBand; // 5*Hz
BYTE FrequencyHighBand; // 500*Hz
SHORT DirectionAngle; // −180 − + 180
SHORT ElevationAngle; // −180 − + 180
SHORT WorkVerticalAngleBegin; // −180 − + 180 with 2 deg step
SHORT WorkVerticalAngleEnd; // −180 − + 180 with 2 deg step
SHORT WorkHorizontalAngleBegin; // −180 − + 180 with 2 deg step
SHORT WorkHorizontalAngleEnd; // −180 − + 180 with 2 deg step
} VENDOR_MIC_CONFIG;
```

In the NHLT Specification, types of microphones may be specified (e.g., omnidirectional, subcardioid, cardioid, supercardiod, hypercardiod, 8shaped, vendor defined. As to panel locations, the NHLT Specification includes top, bottom, left, right, front and rear.

As an example, a method can include using a particular mode or modes of operation with respect to one or more microphones. For example, where finger tap location detection is desired for a user that can tap on a surface of a housing of a computing device, which may be in a closed clamshell orientation, the computing device may be transitioned to a particular mode upon closure, prior to closure and/or after closure. As an example, where multiple microphones are utilized, each microphone may be provided with its own channel and/or two or more microphones may share a channel. In either instance, vibration signals as acquired by one or more microphones can be analyzed to determine a location or locations of an object or objects contacting a surface of a housing of a computing device.

As shown in FIG. 3, the bezel 310 includes a front surface 312 and an opposing rear surface 314 where various openings extend between the front surface 312 and the rear surface 314. For example, as shown, the bezel 310 includes a display opening 313, a camera opening 315, a shutter control opening 317, and an IR camera opening (e.g., where an IR camera is included, noting that a camera may be a combined visible and IR camera).

As shown, the camera module 330 couples to the back side cover assembly 380 where the wiring 370 operatively couples to the camera module 330 and to the one or more microphones 360 (e.g., 360-1, 360-2, 360-3 and 360-4). The display assembly 300 can be operatively coupled to other circuitry of the computing device 200, for example, via the one or more wiring connectors 375.

As explained, a computing device such as the computing device 100, the computing device 200, etc., can include a housing or housings with a surface or surfaces. In various orientations, a surface may be accessible to a user. For example, consider a closed clamshell orientation where a back side of a display housing is accessible to a user and/or a back side of a keyboard housing is accessible to a user. As to a tablet form factor computing device, a housing can include a front side as a display side and a back side where the back side can be accessible to a user.

As an example, a surface of a housing can be utilized for interactions with a computing device. For example, consider a finger tap, which may apply a force that is in a range from approximately 0.1 N to 30 N. For sake of comparison, a minimum key actuation force for a depressible key of a keyboard may be greater than a resting force of a finger on a key (e.g., a relaxed finger weight) such that the minimum key actuation force is in a range of approximately 0.4 N to approximately 1 N.

As an example, an interaction between a finger or fingers and a surface of a housing may be detected using one or more circuits. For example, consider a motion sensor that can detect the effect of force applied by a finger to a surface of a housing, a microphone that can detect the effect of force applied by a finger to a surface of a housing, etc. In such examples, one or more other circuits may be utilized for detecting presence of a finger. For example, consider an antenna or antennas that can detect the presence or absence of a finger or fingers. In such an example, information from an antenna or antennas may supplement information from another sensor or sensors such that an interaction can be detected and, for example, classified for one or more purposes.

In the example of FIG. 2, some examples of circuits that include at least one antenna are shown such as, for example, the NFC module 222, the wireless-WAN card 223, the wireless-WAN antenna assembly 224, the wireless-LAN antenna assembly 233, etc. As an example, one or more of such circuits may provide information that can be utilized with information from one or more other circuits such as, for example, the one or more motion sensors 290, the one or more microphones 360-1, 360-2, 360-3 and 360-4, the one or more motion sensors 390, etc.

As to a motion sensor and a microphone, they can sense vibration signals. For example, a finger tap can cause an accelerometer to sense vibration (e.g., via movement of one or more internal components, etc.) and/or cause a pressure wave that causes a microphone to sense vibration (e.g., via movement of a diaphragm, etc.).

As an example, a method can include receiving vibration signals responsive to an object forcibly contacting a location on a back surface of a display housing of a computing device; and, responsive to receipt of the vibration signals, performing at least one action via circuitry of the computing device, where the at least one action includes a user perceivable action.

As an example, a method can include receiving vibration signals responsive to an object contacting a location on a housing of a computing device; analyzing the vibration signals to determine the location; associating the location with a predetermined value; and transmitting the predetermined value.

As an example, a method can include detecting a pattern of finger taps to instruct a computing device to perform a task (e.g., wake-up, change power state, calendar notification, voice control, timekeeping, etc.). In various instances, such interactions may occur when a clamshell computing device is in a closed clamshell orientation. In such an approach, a user may interact with a computing device without opening the computing device (e.g., transitioning it from a closed orientation to an open orientation).

As an example, a computing device can include circuitry that provides for customizing a surface of a housing for interaction. For example, consider an application that can effectively make a back side of a display housing (e.g., the A-cover) function as a beat box or a wooden box that is used for percussion. In such an example, signals generated from sensed user interaction can be translated into one or more types of audio signals, for example, using audio circuitry of the computing device. As to output of sound, output may occur via one or more speakers of the computing device and/or one or more speakers that are operatively coupled to the computing device (e.g., via wire, wireless, etc.). In such an approach, audio circuitry may provide for assigning sounds and/or effects to one or more regions of a surface of a housing. For example, consider assigning regions of a surface to various pieces of a drum kit (e.g., snare, bass, tom, cymbal, etc.) and/or to various types of controls (e.g., volume, mix, audio effect, etc.).

As an example, a back side of a display housing may be finished and/or made of a material that is relatively resistant to finger taps, finger oils, etc. For example, a back side of a display housing (e.g., a back side surface) may be made of a polymeric material that is relatively easy to clean and/or sterilize. As an example, a surface may be suitable for interaction with one or more objects other than a finger as an object. For example, consider a drumstick, a pencil, a pen, etc. In such an approach, a back side of a display housing may be an electronic percussion instrument that can provide for mimicking one or more instruments and optionally one or more controls.

As explained, a computing device can include features that allow for a user to at least initiate an interaction with the computing device and, for example, to drive one or more entertaining and useful applications.

As mentioned, an accelerometer is a type of motion sensor that can be utilized to sense tapping on a surface of a computing device. As an example, circuitry can provide for estimating location of a tap or taps where location can be associated with one or more commands, sounds, etc. As an example, given a sufficient level of precision in locating a tap or taps, a surface of a computing device may provide for simulating a piano keyboard and/or one or more other devices.

As mentioned with respect to FIG. 3, a display housing can include LED circuitry (see, e.g., the circuit 385) where illumination from one or more LEDs can be visible on a surface of the back side of a housing. In such an example, such LED circuitry can be utilized for one or more purposes such as, for example, feedback, guidance, etc. For example, consider using illumination to assist with timing of one or more rhythms that a user is trying to follow (e.g., learn how to play). As an example, illumination may be colored to indicate how close a user is to following a rhythm. For example, if the user is off by more than a number of milliseconds, red illumination may be presented while if the user is off by less than a number of milliseconds, green illumination (e.g., or no illumination) may be presented. As an example, illumination color may differ depending on whether a user is early or late as to a beat, which can then guide the user to more appropriately in synchronization with the beat. As an example, output may be via sound and/or illumination. As an example, a handicap assist voice may be provided, for example, to read time, Internet content, other content, etc.

Figure 4:
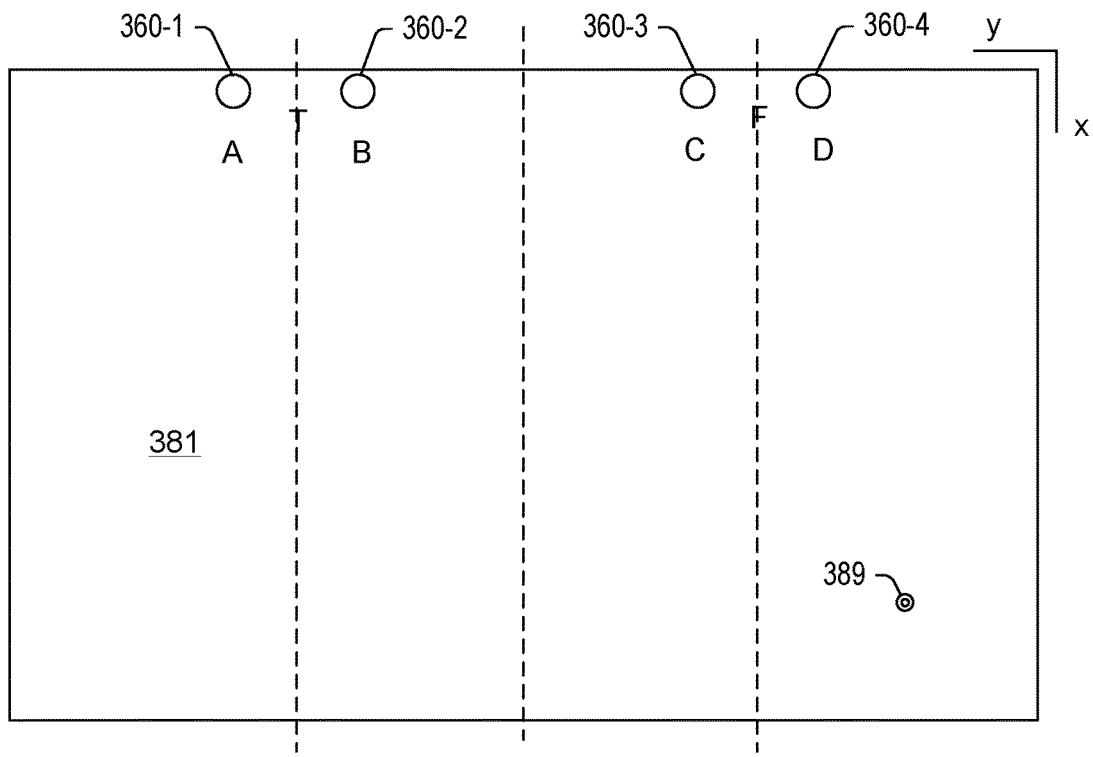
FIG. 4 is a diagram of an example of a device.
Figure 4:
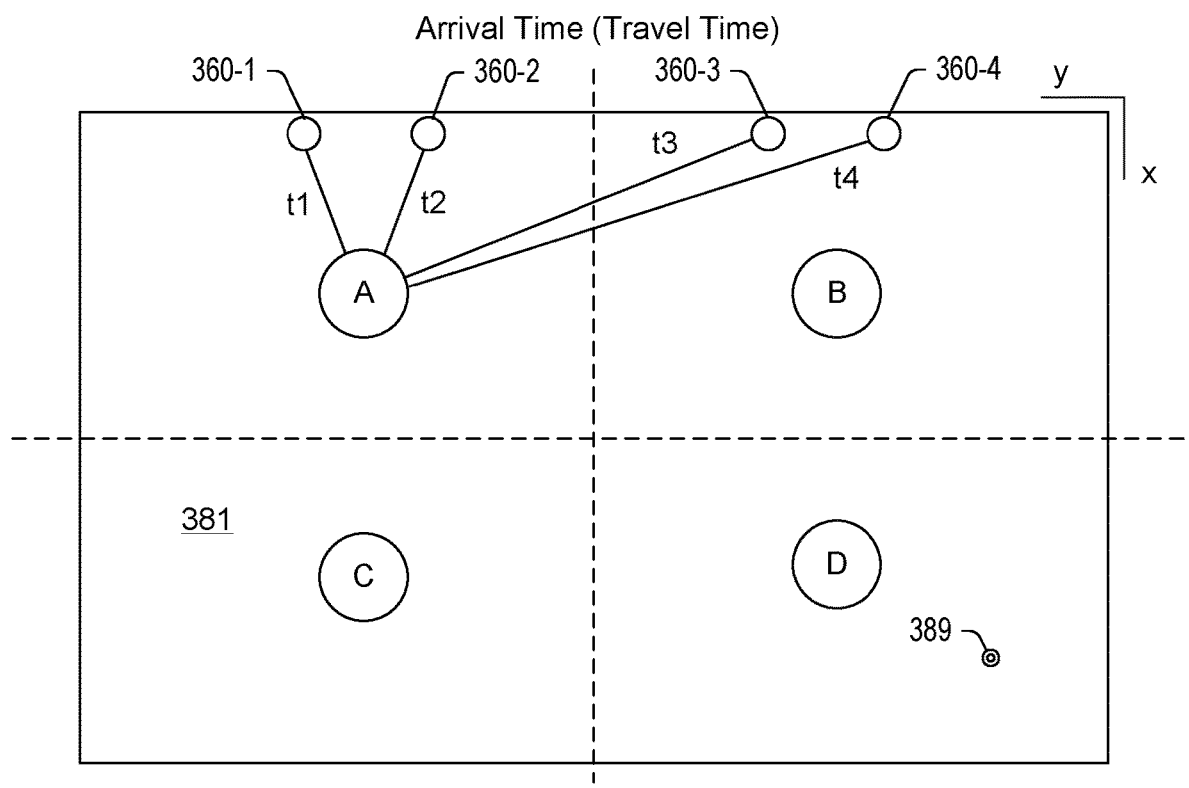

FIG. 4 shows an example of the back side surface 381 of the display assembly 300 of FIG. 3 where positions of the microphones 360-1, 360-2, 360-3 and 360-4 are indicated, along with an aperture for LED illumination 389, which, as mentioned, may be presented through use of LED circuitry (see, e.g., the circuitry 385 in FIG. 3) that is operatively coupled to vibration sensing circuitry (e.g., one or more motion sensors, one or more microphones, etc.).

In the example of FIG. 4, the surface 381 can be effectively divided into regions, which are labeled T and F and A, B, C and D. In such an approach, T may represent "true" and F may represent "false" and A, B, C and D may represent choices for a multiple choice question. In the example of FIG. 4, circuitry of the computing device 300 can locate vibration signals that result from contact between an object and the surface 381. In such an approach, the surface 381 may be utilized as an answer surface for receipt of answers to questions.

In FIG. 4, one approach to locating vibration signal sources can involve utilization of arrival time, which may correspond to travel time. As an example, a computing device may utilize one or more of a group of techniques known as multilateration to perform sound source localization via Time Delay Estimation (TDE). Such an approach can leverage signals from two or more microphones. In such techniques, TDE factors can be calculated pair-wise where a source can be localized using the TDE factors. In such an approach, TDE does not depend on position of microphones or source, which implies that two stages of calculating TDE and localizing sound source are independent of one another. As geometry of an array of microphones is not necessarily incorporated by TDEs, the TDE factors can be calculated independent of the location of the microphones. Such an approach may be challenging at times as it is not certain that a source coordinate exists that is stable with all TDEs. However, in the example of FIG. 4, the geometry of the array of microphones can be known and utilized to address such an issue. Further, as an example, the Maximum Likelihood method can be implemented to achieve multialteration. For example, consider utilizing the form of least squares.

As an example, another approach to locating vibration signal sources can involve multichannel sound source localization, which can aim to determine all of the time delays simultaneously, which means that the common stability of the system tends to be ensured. This category of localization can be divided into two subcategories. In the first subcategory, the impulse responses of sound waves can be used to calculate TDEs in order to localize the sound source.

Other approaches may include beamforming and a so-called high resolution-based procedure. Beamforming may include consideration of spatial time-frequency and double estimation of the Fast Fourier Transform (FFT) where, first, the FFT is applied to achieve a frequency spectrum of the input sound wave while, second, the FFT is applied to obtain the estimated value of direction of arrival (DOA).

As an example, an approach may utilize cross correlation for detection of delays. In such an approach, the difference between the times at which the signal has arrived at the two microphones is referred to as the time delay of the signal. In the example of FIG. 4, the time delay between any pair of microphones in the system can be computed using a signal processing technique referred to as cross correlation, which can take, as input, two copies of a signal received at a pair of microphones. The outputs of this function are some coefficients referred to as cross correlation coefficients, which correspond to the value of each calculated time delay.

The cross-correlation coefficients can be computed by taking a sum of product of the corresponding portion of the signals when they intersect with one another. The value of each cross correlation coefficient represents a specific time delay of a signal in reaching the two microphones.

As an example, a computing device can include a machine learning model that provides for classifying vibration signals from one or more sources. For example, consider generation of training data using test contacts at various locations on a surface of a housing where the locations of the test contacts are known. In such an approach, the locations can be labels for the training data. In training, weights of a machine learning model may be adjusted until the training data can be suitably classified to appropriate locations (e.g., which may be a reduced set of locations that correspond to regions). A trained machine learning model may be lightweight and deployable in a computing device for operation in real-time (e.g., or near real-time).

As explained, one or more types of techniques may be utilized for processing vibration signals from one or more sources and/or one or more types of sources to locate contact of an object with a surface of a housing.

Figure 5:
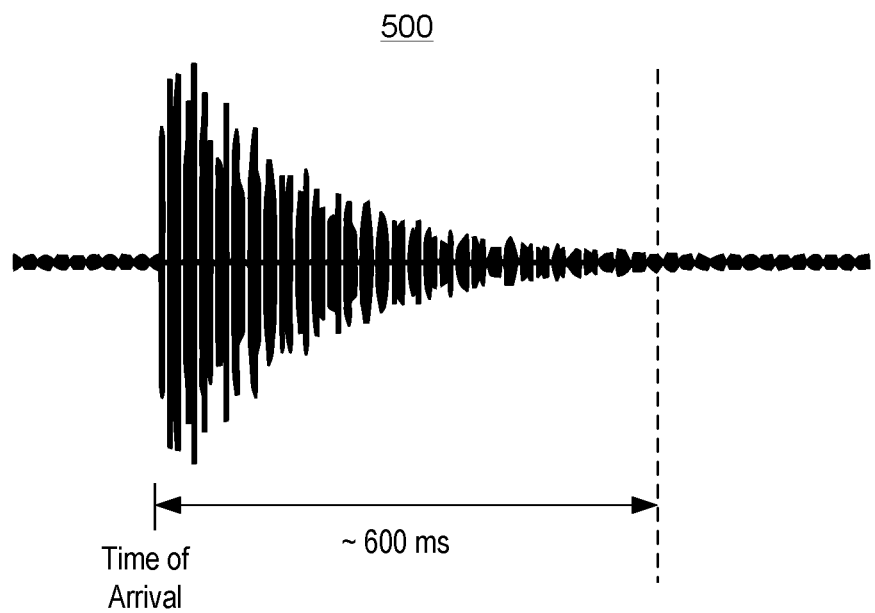
FIG. 5 is a diagram of example waveforms.
Figure 5:
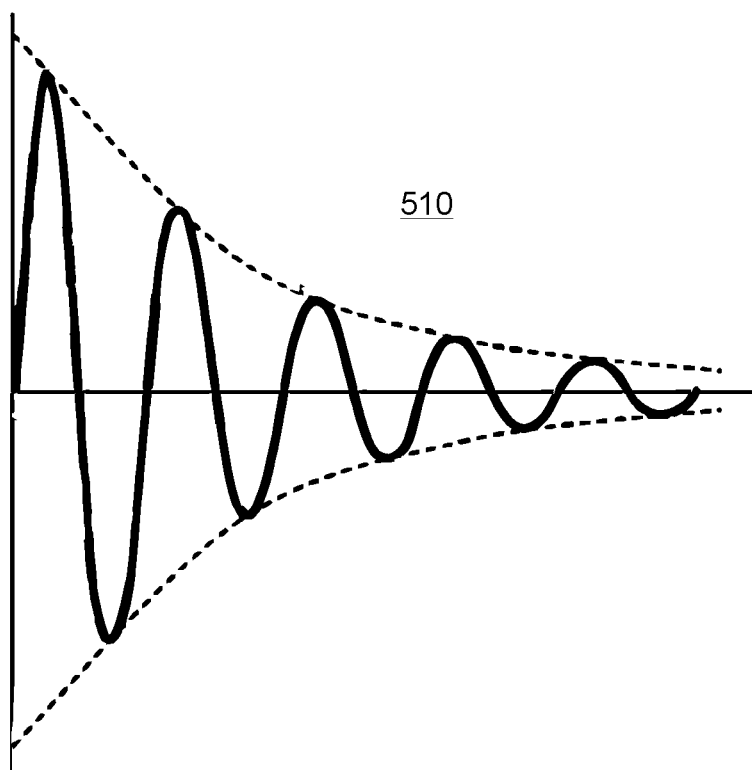

FIG. 5 shows an example of a waveform 500 of an actual tap on a surface of a housing of a computing device along with an approximate ideal waveform 510 that can define an envelope as an amplitude signal with respect to time. In the example of FIG. 5, the length of the waveform 500 is approximately 0.6 s (e.g., 600 ms). In the example of FIG. 5, a time of arrival can be discerned at the head of the waveform (e.g., by a substantial increase in amplitude).

Figure 6:
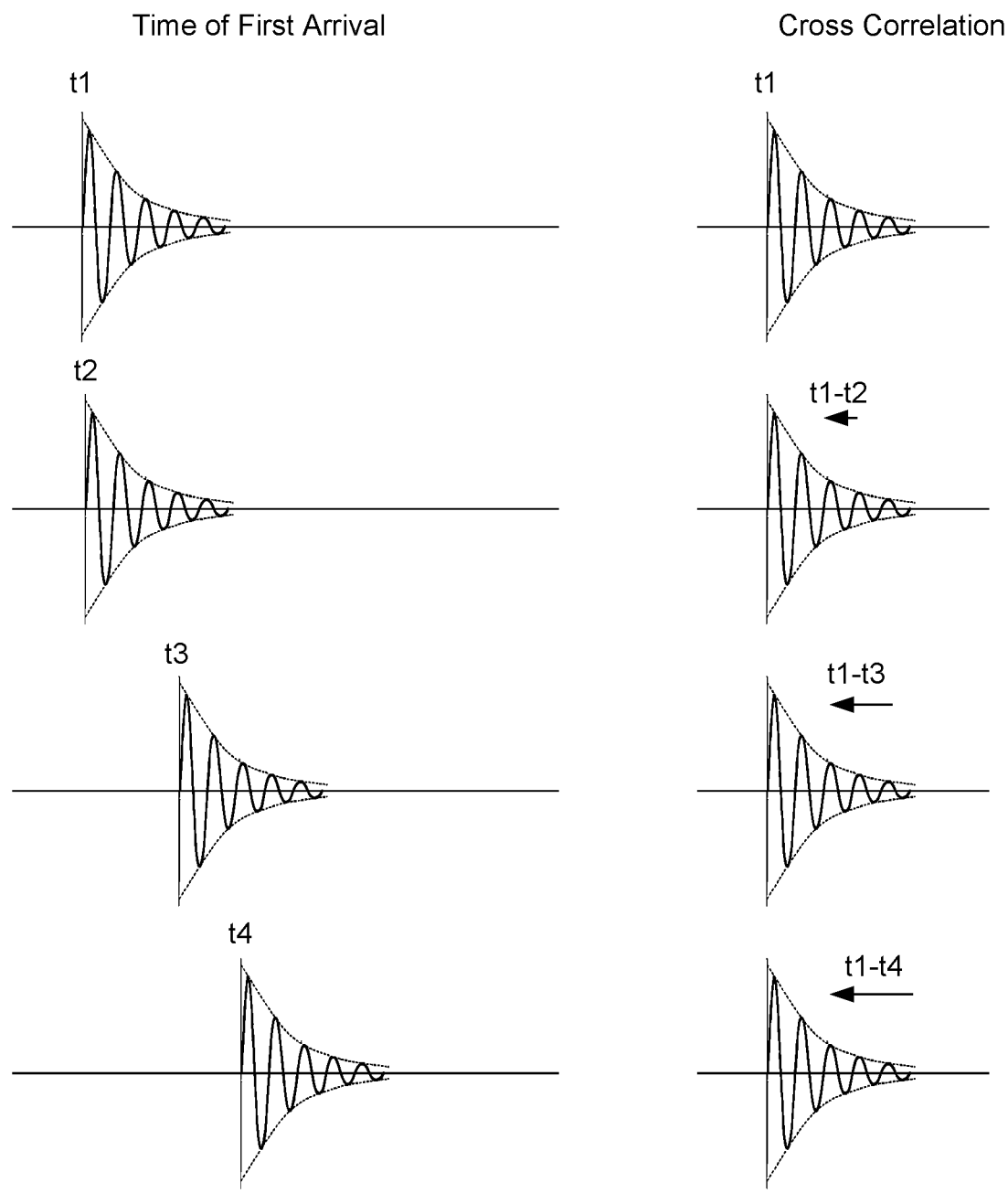
FIG. 6 is a diagram of example waveforms.

FIG. 6 shows an example method 600 where time of first arrival is indicated for four vibration signals (e.g., microphone, motion sensor, etc.), which, as mentioned, may be from a single channel or multiple channels (e.g., audio circuitry channel(s)). As shown, a cross correlation approach may be utilized to determine differences between time of first arrival (see, e.g., arrows). In particular, three times are shown: t1-t2, t1-t3 and t1-t4. The times can be referenced with respect to an earliest time, which may be denoted "t1" or otherwise indicated (e.g., as associated with a particular sensor and/or sensor location).

In the example of FIG. 4, the four microphones 360-1, 360-2, 360-3 and 360-4 can be in the same plane where coordinates for their locations are known. In such an example, the four microphones 360-1, 360-2, 360-3 and 360-4 can provide six time differences where time difference equations can be formulated for each time difference that can involve distances from the source to the microphones 360-1, 360-2, 360-3 and 360-4. In the example of FIG. 4, the source coordinates may be solved in terms of x and y (e.g., xs and ys). As an example, consider an equation as follows:

$$\begin{bmatrix} 1 & 0 & 0 & -1 \\ 0 & 1 & 0 & -1 \\ 0 & 0 & 1 & -1 \\ u & v & w & 1 \end{bmatrix} \begin{bmatrix} X2 \\ X3 \\ X4 \\ X1 \end{bmatrix} = \begin{bmatrix} ct12 \\ ct13 \\ ct14 \\ A \end{bmatrix}$$

In the foregoing equation, three unique time differences can be known, t12, t13 and t14 and multiplied by the speed of sound, c, in the particular medium, where each time difference equation involves the distances from the source to the microphones. For example, consider the equation below for X1 as a distance between the microphone 1 and the source:

$$X1 = \frac{uct12 + vct13 + wct14 + A}{u + v + w + 1}$$

where, in radial coordinates, u, v and w can be defined with respect to coordinates of the microphones.

Knowing the four values of X1, X2, X3 and X4, for the four microphones being in a plane, it is possible to solve for the source coordinates as follows:

$$s = [xs \ ys \ 0]^T = \frac{1}{2}(S^T S)^{-1} S^T (\delta - 2X1d)$$

where $$S = \begin{bmatrix} x2 & y2 & z2 \\ x3 & y3 & z3 \\ x4 & y4 & z4 \end{bmatrix}$$

$$d = \begin{bmatrix} X1 - X2 \\ X1 - X3 \\ X1 - X4 \end{bmatrix}$$

$$\delta = \begin{bmatrix} r2^2 - d1^2 \\ r3^2 - d2^2 \\ r4^2 - d3^2 \end{bmatrix}$$

In the example of FIG. 4, a technique may be simplified using a data structure or data structures that include predetermined values and/or ranges. In the example of FIG. 4, the speed of sound in the appropriate material of construction may be utilized, which can be faster than the speed of sound in air (e.g., approximately 343 m/s). As to the speed of sound in various materials consider aluminum as approximately 6420 m/s, magnesium as approximately 5770 m/s, acrylonitrile butadiene styrene (ABS) as approximately 2200 m/s, and carbon fiber reinforced plastic (CFRP) as approximately 3000 m/s; noting that one or more other materials may be utilized for a housing to form a surface that is suitable for contacting to generate vibration. As indicated, metals tend to have higher speeds than some other materials such as polymers. As an example, a shell that forms a surface of a housing may include multiple materials, optionally laminated where layers may be contiguous, non-contiguous, separated, etc.

Using the speed of sound of ABS as approximately 2200 m/s and dimensions of a 14-inch (360 mm) screen computing device weighing 1.35 kilograms (3.0 lb) that is 12.8 inches (330 mm) by 8.94 inches (227 mm) by 0.68 inches (17 mm), the distance from a contact as a source to a microphone can be expected to be less than 360 mm (36 cm or 0.36 m). Hence, a time to arrival would be approximately 0.00016 seconds for ABS. In such an example, sound waves (e.g., longitudinal waves) may also arrive via air, which has a much lesser speed of sound. For example, a time to arrival would be approximately 0.001 s (1 ms). As an example, a microphone may generate a vibration signal that can be windowed from approximately 2 ms to approximately 0.02 ms as to a time of arrival. As an example, a window can be larger, as explained with respect to the example of FIG. 5, as a complete waveform of a tap may be approximately 100 ms to approximately 1000 ms (e.g., 1 s) or more. As an example, a technique may apply one or more windows where one or more types of signals may be identified within a window or windows (e.g., for material transmission, air transmission, etc.). In such an example, a window may depend on size of a surface and, for example, locations of regions on the surface.

As to sampling rate, a microphone may provide a sampling rate in excess of approximately 1 kHz and, for example, may provide a sampling rate that equates to an audio standard such as 44.1 kHz or more. At a sampling rate of 44.1 kHz, each sample is approximately 0.00002 seconds (0.02 ms). As an example, a waveform can be analyzed (e.g., consider as an envelope) to determine an initial time of the waveform that can be a time of arrival. As explained, for multiple microphones, time of arrival differences may be computed and utilized in locating a source (e.g., a source location or contact location).

As explained, a technique for locating a source may include accessing one or more data structures that include information from trials, which may be performed at a laboratory, manufacturing facility, etc., and loaded into memory of a computing device (e.g., via a medium, via a network, etc.). As an example, a technique may include performing trials by a user. For example, a user may be instructed to tap a surface of a housing at various predetermined locations where sensed information (e.g., vibration signals, etc.) can be analyzed to calibrate the computing device for purposes of locating a source.

As explained, one or more techniques may be employed to determine a source location given one or more vibration signals.

Figure 7:
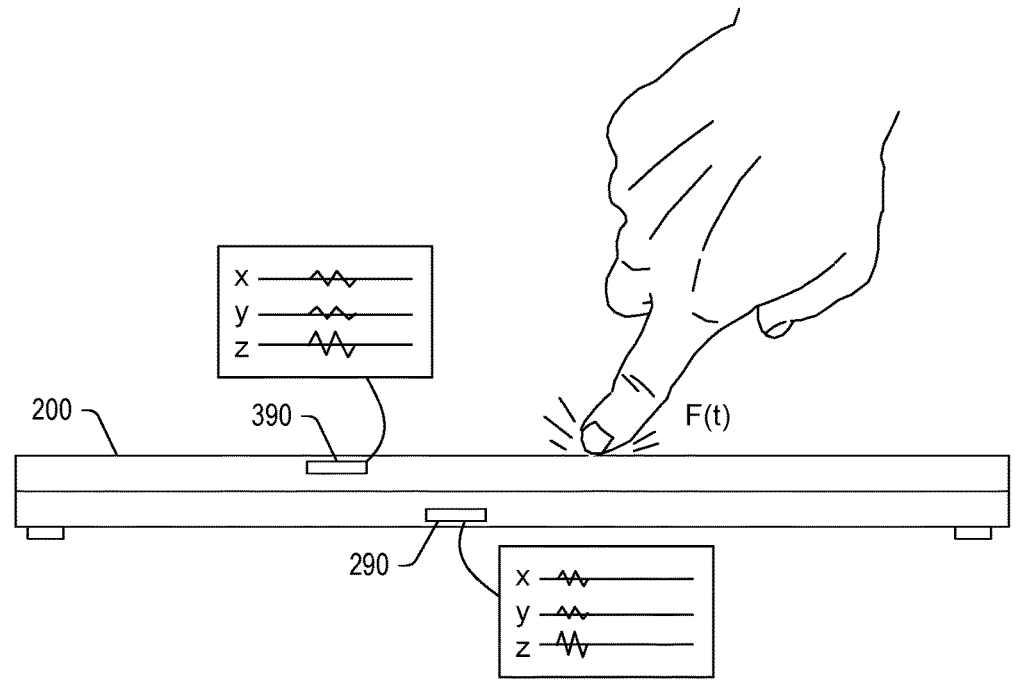
FIG. 7 is a series of diagrams of an example of a device.
Figure 7:
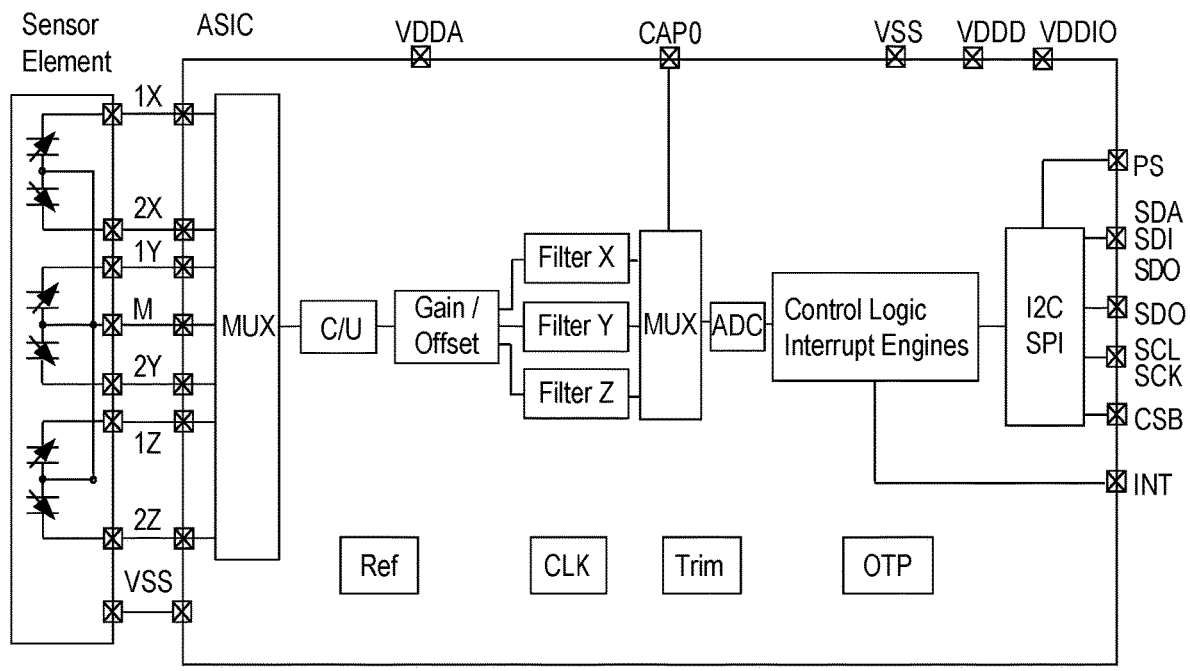

FIG. 7 shows an example of the computing device 200 and motions sensors 290 and 390. As mentioned, a device can include a motion sensor or motion sensors. As an example, a subsystem may include and/or be operatively coupled to an orientation/motion framework for access to orientation and/or motion data from sensing circuitry. Such a framework may support access of raw and/or processed accelerometer data, for example, using block-based interfaces. As an example, consider a device with a gyroscope where a framework provides for retrieval of raw gyro data, processed data, etc. A framework may allow for accelerometer and/or gyro-based data to one or more applications that can utilize orientation and/or motion as input. As a particular example, consider an instance of a CMAccelerometerData class that represents an accelerometer event, which may be a measurement of acceleration along multiple spatial axes at a moment of time (e.g., typedef struct {double x; double y; double z;} CMAcceleration).

As shown in FIG. 7, the device 200 can include multiple motion sensors such as the motion sensor 290 and the motion sensor 390 where each of the motion sensors 290 and 390 can generate vibration signals. As the motions sensors 290 and 390 are not collocated, in that they are at different positions, the vibration signals differ. Such differences can be utilized in determining a location of the force contact indicated as F(t). In the example of FIG. 7, the vibration signals are shown as including x-axis, y-axis and z-axis channels. As an example, a motion sensor may provide for single axis or multi-axis output where vibration signals of one or more axes may be utilized for purposes of locating a source. As an example, one or more motions sensors may provide for determining an orientation of one housing with respect to another housing and/or orientation of a single housing. In such an example, one or more motions sensors (e.g., and/or one or more other sensors) may provide for detecting a transition from one orientation to another (see, e.g., the various example orientations in FIG. 1, which can include one or more open clamshell and one or more closed clamshell orientations).

As an example, the device 100 of FIG. 1 or the device 200 of FIG. 2 and FIG. 3 can include a processor, memory and motion sensing circuitry, which may be in the form of one or more motion sensors. As an example, motion sensing circuitry may include multi-axis sensing circuitry such as one or more of a gyroscope and an accelerometer (e.g., consider a STMicroelectronics L3G4200D unit, a Bosch BMA220 unit, etc.). As an example, the sensing circuitry may include a tri-axial, low-g acceleration sensor with digital interfaces and/or a three-axis gyroscope.

FIG. 7 shows an example of circuitry 700 that includes sensing circuitry (e.g., an orientation sensor). In particular, a sensor element is shown that includes x, y and z sensing circuits, which may be accelerometer circuits. As an example, the x, y and z sensing circuits may correspond to x, y and z coordinates. As an example, a coordinate system may define yaw, roll and pitch. As an example, yaw may be defined to be planar motion (e.g., rotation) and roll and pitch may be defined to be motion that tilts a plane (e.g., a geometrical plane), which may be a plane defined at least in part by an electronic device.

As shown in the example of FIG. 7, the circuitry 700 may include an $I^2C$ interface (also, e.g., "I2C") and/or an SPI interface (e.g., which may operate via receipt and/or transmission of information via one or more busses). In such an example, one or more of the interfaces of the circuitry 700 may be operatively coupled to one or more interfaces of a computing device.

As an example, the circuitry 700 may include signal processing circuitry such as one or more amplifiers, multiplexers, filters, analog-to-digital converters (ADCs), control logic, interrupt engines, etc. As an example, sensing circuitry may include an ASIC that is operatively coupled to one or more sensor elements. In such an example, signals generated by a sensor element may be processed and, for example, transmitted as information via one or more interfaces, one or more busses, etc. As an example, a processor that can execute an application in an operating system environment may receive such information, process at least a portion of the information and transmit information to circuitry.

As an example, a device can include digital signal processing (DSP) circuitry that can process information from such as at least a portion of the circuitry 700 of FIG. 7. As an example, DSP circuitry may provide for features such as a configurable buffer (e.g., FIFO, circular, etc.), free-fall and motion detection, transient detection (e.g., fast motion, jolt), enhanced orientation with hysteresis and optionally z-lockout, shake detection, tap and multi-tap detection, etc.

As an example, an accelerometer may have a sampling rate that is in a range from approximately 10 Hz to approximately 3 kHz or more. In various instances, an accelerometer sampling rate can be less than a microphone sampling rate. As explained, a combination of different types of sensor data may be utilized in determining a source location. For example, a decision tree type of structure may be utilized where, if microphone vibration signals provide a source location that is at or near a boundary between regions, one or more other types of signals may be utilized to aid in making a final decision. For example, consider using vibration signals from one or more accelerometers to decide a region of a source where some amount of uncertainty exists as to the region as based on microphone vibration signals.

As an example, a human hand and/or arm may affect EM radiation such as, for example, to cause resonance shift and/or distortion in one or more radiation patterns. As example, antenna-body separation and position with respect to each other can affect antenna performance and/or signals received in one or more manners.

Figure 8:
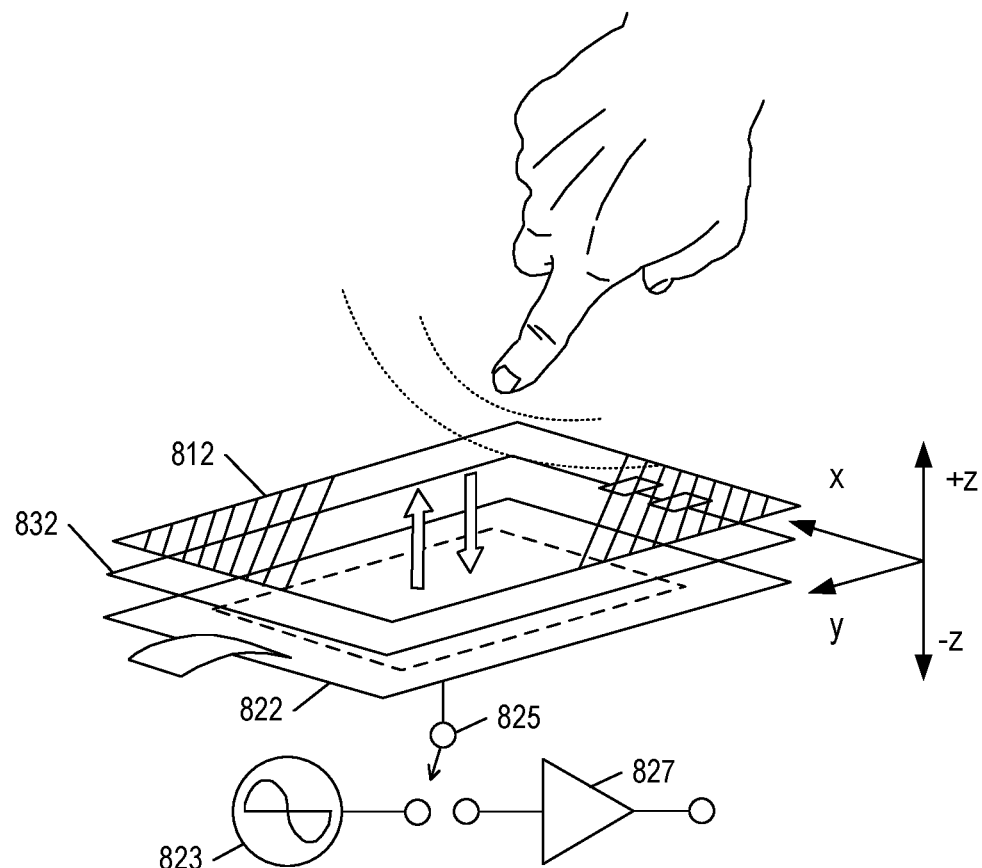
FIG. 8 is a diagram of examples of circuitry of a device.
Figure 8:
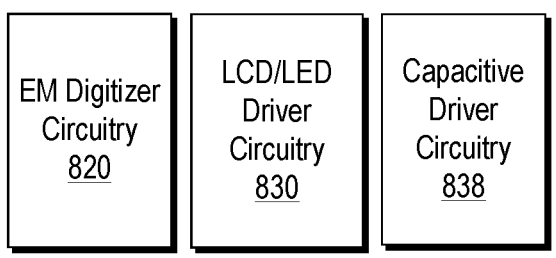

FIG. 8 shows an example of a portion of a computing device that includes panels 812, 822 and 832 as may be present in a display housing of a display assembly that can include EM digitizer circuitry 820, LCD/LED driver circuitry 830 and/or capacitive driver circuitry 838. As shown, circuitry may include or be operatively coupled to a high frequency source 823, a transmission and reception switch 825 (e.g., a coil switch) and a receiver 827.

As an example, the capacitive driver circuitry 838 may include a signal source operatively coupled to the drive lines of a panel, a multiplexer operatively coupled to the sense lines of the panel and an analog-to-digital converter (ADC), for example, to convert sensed analog signals of the sense lines received via the multiplexer to digital signals.

As an example, circuitry may include digital signal processing (DSP) circuitry that can receive digital signals and provide output based at least in part on digital signal processing. As an example, DSP circuitry may receive an output array from the circuitry 820 or 838 where values in the array represent information at, for example, x-y intersections of a grid of a panel.

As shown in the example of FIG. 8, a human hand may interfere with circuitry in a manner that presence and/or absence of a human hand can be detected. As an example, various circuitry in FIG. 8 may be operable from a display side of a display housing, for example, for interactions guided by graphics, images, etc., rendered to a display (e.g., via the LCD/LED driver circuitry 830). In instances where a display side is not accessible, for example, in a closed clamshell orientation of the computing device 100, the computing device 200, etc., circuitry may still remain active for one or more other purposes. For example, consider such circuitry being able to provide information regarding one or more contacts between an object and a back side of a display housing. Such information may augment information acquired via one or more sensors that can sense vibration signals responsive to one or more contacts. As an example, a localization technique for locating a tap on a back side of a display housing may include using information from the EM digitizer circuitry 820 and/or the capacitive driver circuitry 838, where present.

Figure 9:
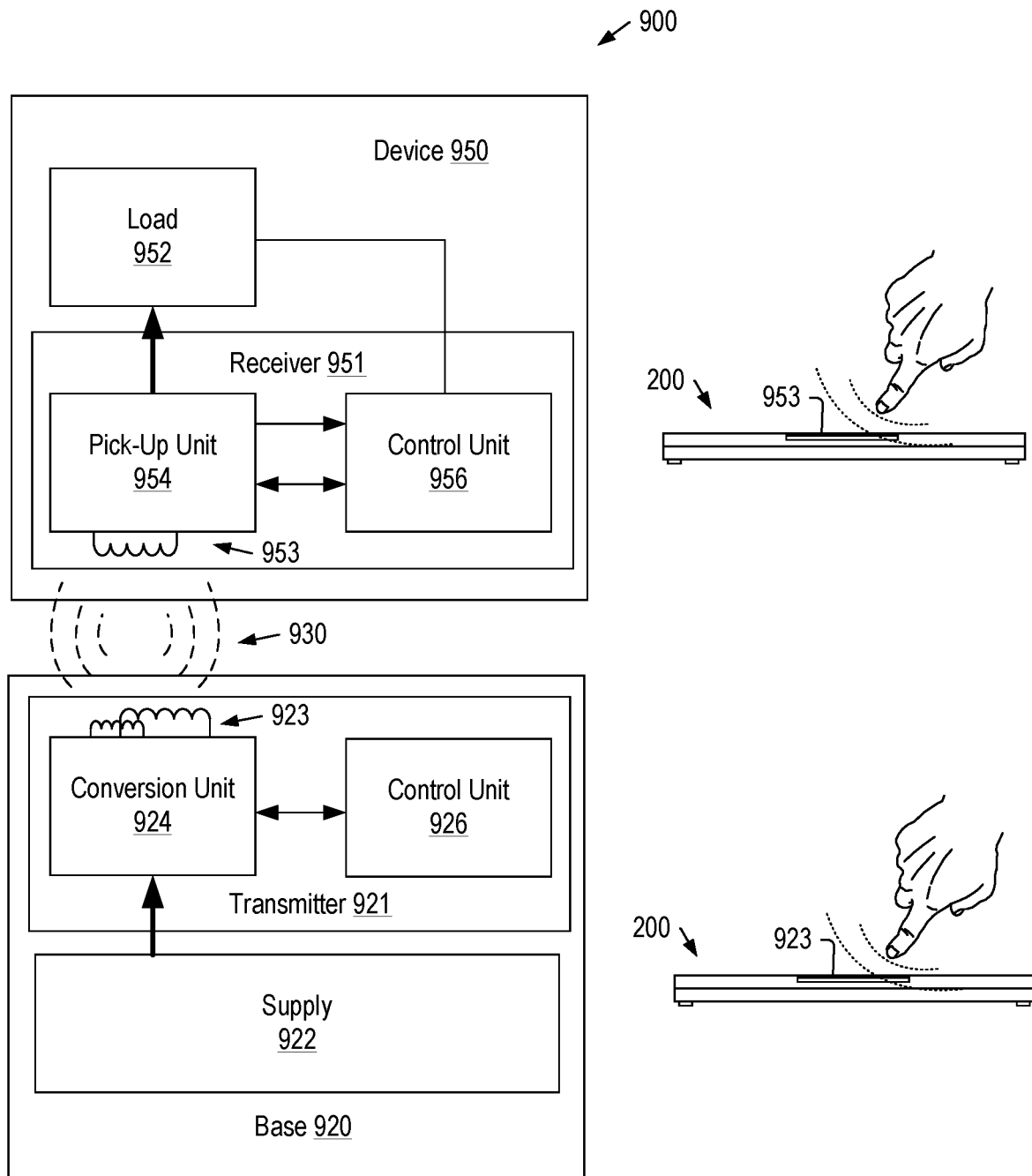
FIG. 9 is a diagram of examples of circuitry of a device.

FIG. 9 shows an example of a system 900 that includes a base 920 and a device 950 where the base 920 can transmit energy to the device 950, for example, to power the device 950, to store power in a battery of the device 950, etc.

As an example, the base 920 and/or the device 950 may operate according to one or more standards where compatibility exists such that energy can be transmitted from the base 920 to the device 950. As an example, consider the Qi standard. Devices that operate according to the Qi standard utilize electromagnetic induction between coils, which can be planar coils. A Qi system includes two types of devices, a base (e.g., a base station), which includes or is connected to a power source and provides inductive power, and a device such as, for example, a mobile device (e.g., a mobile phone, a mobile peripheral, etc.), which can consume inductive power provided by the base.

As shown in FIG. 9, the base 920 can include a power transmitter 921 that receives power from a supply 922 where the power transmitter 921 can include one or more transmitting coils 923 that generate an oscillating magnetic field 930 in a space. In the example of FIG. 9, the supply 922 may be one or more types of power sources.

As an example, converter circuitry may be included as part of the base 920 or separately from the base 920 where such converter circuitry can convert AC power to DC power, at a level sufficient for operation of the base 920. As an example, a cable can be provided that can electrically connect the base 920 to one or more sources of electrical power (e.g., a battery, a wall outlet, a device, etc.).

As shown, the device 950 can include a power receiver 951 that includes a receiving coil 953. In the example of FIG. 9, the magnetic field 930 can induce an alternating current in the receiving coil 953 by Faraday's law of induction. Where there is sufficiently close spacing of the coils 923 and 953 (e.g., and sufficient shielding on their surfaces), inductive power can be transferred efficiently from the base 920 to the device 950.

As shown in FIG. 9, the system 900 includes the power transmitter 921 with a power conversion unit 924 and a communications and control unit 926. The control and communications unit 926 can regulate transferred power to a level that a power receiver requests. While the base 920 is shown with a single transmitter, a base may include multiple transmitters (e.g., for multiple devices to be placed and inductively charged). In the system 900, the base 920 may include features for input power provisioning, user interfacing, etc.

As to the power receiver 951, it can include a power pick-up unit 954 and a communications and control unit 956. As shown, the receiving coil 953 can interact with the magnetic field 930 such that energy is transferred to the power pick-up unit 954. The communications and control unit 956 can regulate transferred power to a level that is appropriate for the device 950, for example, as illustrated by the load 952, which may be circuitry associated with one or more batteries electrically connected to the output of the power receiver 951.

As shown in FIG. 9, a human hand may be positioned within a distance of one or more coils (e.g., the coil 923 and/or the coil 953), which may be within a computing device. In such an example, a coil can act as an antenna that can generate a signal or have a signal altered indicative of presence and/or absence of a human hand. As an example, information generated via one or more features of the system 900 of FIG. 9 may be able to provide information regarding one or more contacts between an object and a back side of a display housing. Such information may augment information acquired via one or more sensors that can sense vibration signals responsive to one or more contacts. As an example, a localization technique for locating a tap on a back side of a display housing may include using information from the transmitter 921 and/or the receiver 951 of FIG. 9, for example, if present in the display housing.

Figure 10:
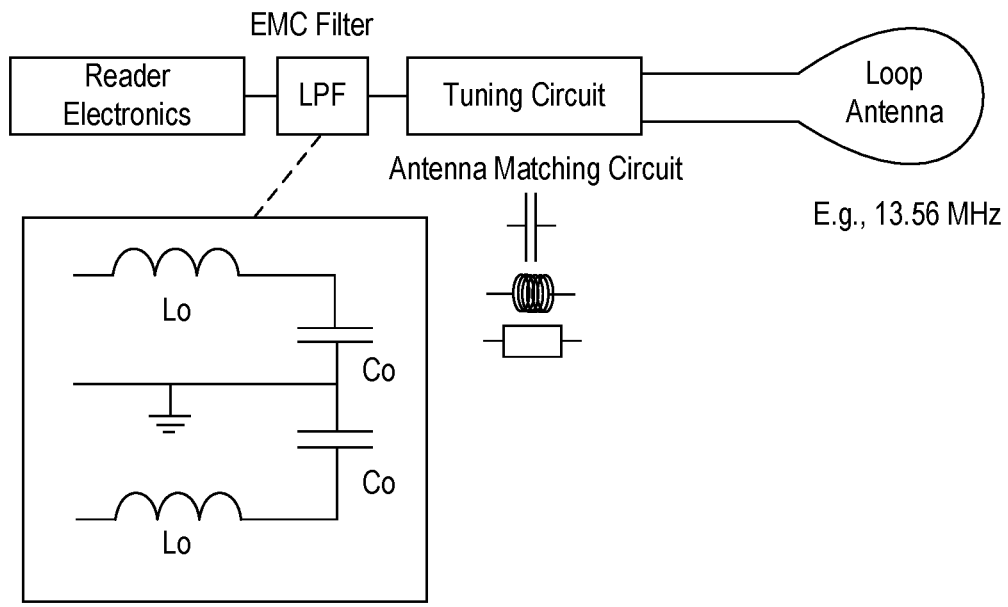
FIG. 10 is a diagram of examples of circuitry of a device.
Figure 10:
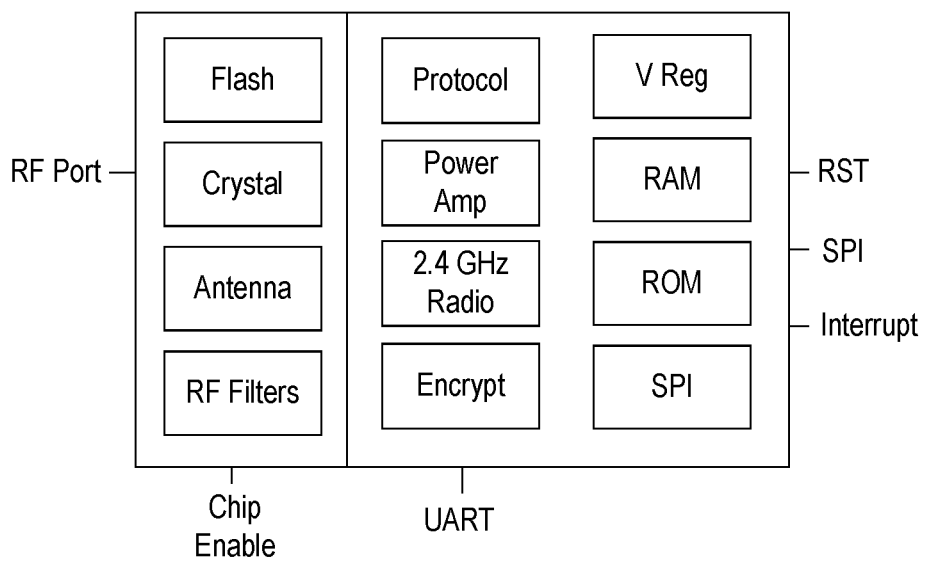

FIG. 10 shows examples of circuitry 1010 and 1060. As explained with respect to the computing device 200, it may include NFC circuitry and/or Wi-Fi circuitry. In FIG. 10, the circuitry 1010 can be NFC circuitry and the circuitry 1060 can be Wi-Fi circuitry. As shown, the circuitry 1010 includes a loop antenna, a tuning circuit, a filter and reader electronics. Such circuitry may provide for generation of information as to the presence and/or absence of a human hand. For example, a human hand near the loop antenna may alter the tuning circuit (e.g., antenna matching circuit) and/or be detectable via a filtered signal by the reader electronics.

Information from circuitry such as the circuitry 1010 and/or the circuitry 1060 may augment information acquired via one or more sensors that can sense vibration signals responsive to one or more contacts. As an example, a localization technique for locating a tap on a back side of a display housing may include using information from the circuitry 1010 and/or the circuitry 1030 of FIG. 10, for example, if present in the display housing.

A computing device can include one or more types of circuitry (e.g., EM circuitry, etc.) that may be affected by the presence of a human hand, a human arm, etc. As explained, such circuitry may provide for the detection of presence and/or absence of a human hand or other human body part. While some examples are given in FIG. 8, FIG. 9, and FIG. 10, other examples can include GPS circuitry, cellular circuitry, etc. (e.g., one or more types of circuitry that include an antenna or a connection to an antenna, etc.). For example, consider at least one member selected from a group that includes WiFi antenna signals, digitizer antenna signals, NFC antenna signals, GPS antenna signals, and wireless power antenna signals. As an example, a method can include receiving at least on antenna signal indicative of presence of a human hand proximate to a housing of a computing device. In such an example, a range of proximity may be from approximately 20 cm to 0 cm (e.g., in contact with the housing). As an example, a maximum value for a range may be adjustable. For example, consider a maximum value that is less than 20 cm where a lesser maximum value can indicate with greater certainty that a human hand is proximate to a housing of a computing device where, for example, a determination may be made as to how close a human hand is to an antenna or antennas of a computing device. In such an example, an antenna signal or antenna signals may supplement information from one or more vibration signals.

Figure 11:
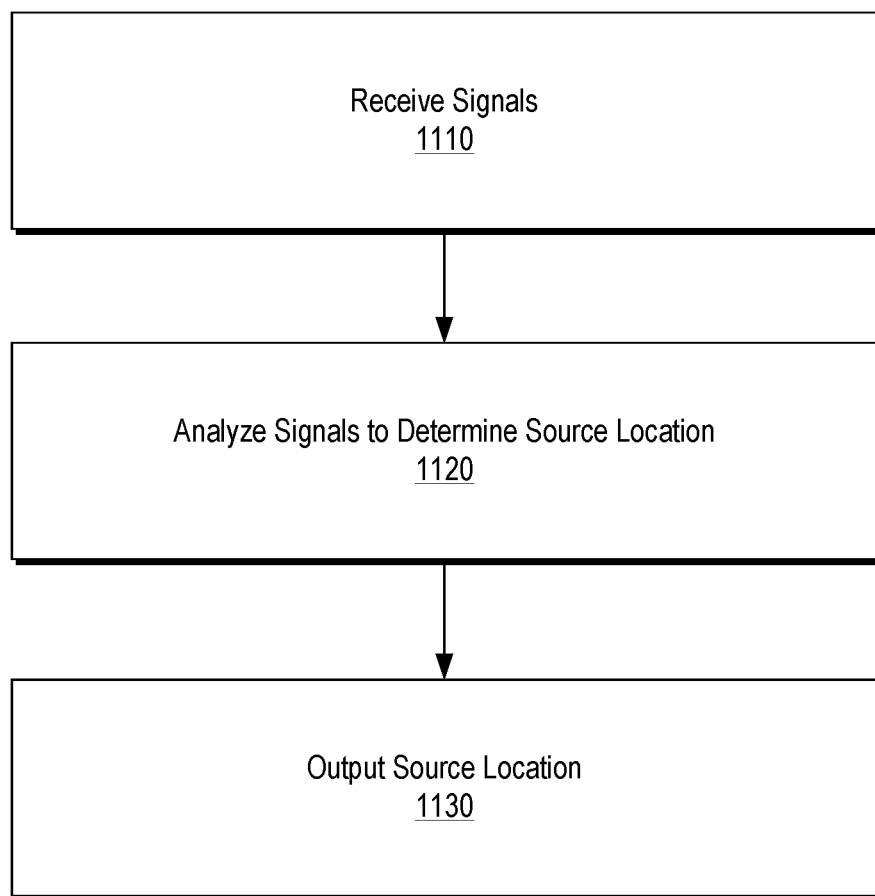
FIG. 11 is a diagram of an example of a method.

FIG. 11 shows an example of a method 1100 that includes a reception block 1110 for receiving signals, where the signals include vibration signals associated with a source where force is applied to a computing device; an analysis block 1120 for analyzing the signals to determine a source location; and an output block 1130 for outputting the source location.

In the example of FIG. 11, the reception block 1110 can provide for receiving vibration signals responsive to an object contacting a location on a housing of a computing device. For example, consider a finger of a human hand contacting a location on a back side of a display housing of a computing device where the computing device may be a clamshell form factor computing device with another housing coupled to the display housing via a hinge assembly.

As an example, the method 1110 can include associating the source location with a predetermined value and transmitting the predetermined value. For example, the output block 1130 can include outputting the source location directly and/or outputting a predetermined value associated with the source location.

As an example, circuitry can provide for outputting a source location based at least in part on analysis of vibration signals where the source location can be defined with respect to a planar 2D coordinate system. For example, a surface of a back side of a display housing of a computing device can be defined as a plane with a 2D coordinate system where one or more sensors carried by the display housing may be effectively assumed to be at the same level of the plane. In such an approach, analysis may be simplified when compared to a 3D location problem. Such an assumption may be considered to be reasonable where a display housing has a thickness that is relatively small (e.g., a relatively thin display housing with a thickness along a z-axis that is less than approximately 5 mm) and has dimensions, for example, along an x-axis and along a y-axis, that are each at less 10 times the thickness, for example, along the z-axis. In such an example, source locations can be output as being in a plane, for example, defined by x and y coordinates. Once output, one or more types of circuitry (e.g., hardware, applications, etc.) may utilize the output for one or more purposes.

Figure 12:
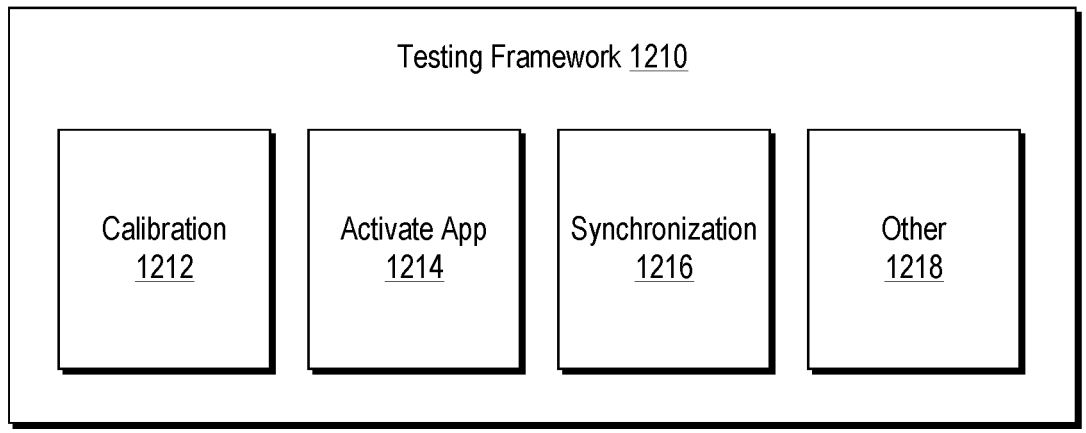
FIG. 12 is a series of diagrams of an example of a framework and an example of a scenario.
Figure 12:
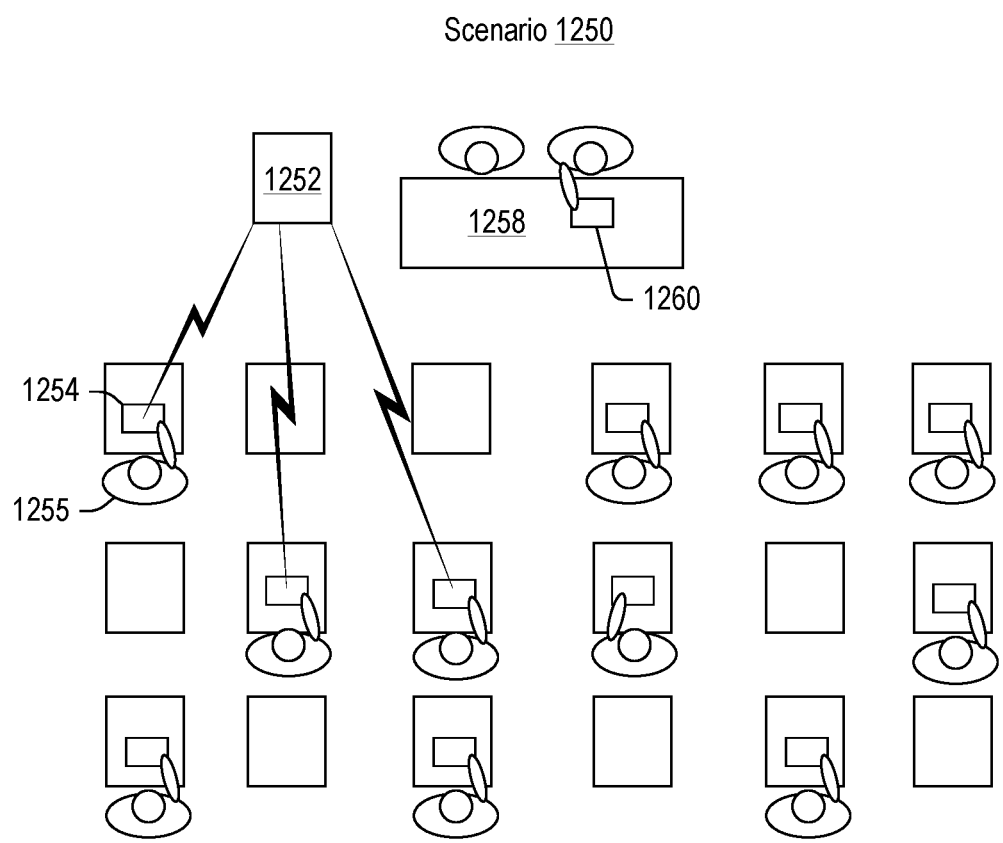

FIG. 12 shows an example of a testing framework 1210 that may be operatively coupled to circuitry that can receive and analyze vibration signals, optionally in combination with one or more other types of signals.

FIG. 12 also shows an example scenario 1250 that includes a centralized computing system 1252 (e.g., a host computing system) that can be in communication with various computing devices 1254 as interacted with by various corresponding users 1255. In the example of FIG. 12, the scenario 1250 shows twelve users 1255 and twelve computing devices 1254 where each of the twelve computing devices 1254 can transmit information to the centralized computing system 1252. As shown, the scenario 1250 can correspond to a testing facility where one or more monitors (e.g., proctors) 1258 may operate computing device 1260 to deliver a test to the users 1255 and, for example, to assure that the computing system 1252 operates to acquire information from the computing devices 1254 responsive to input by the users 1255.

As shown in FIG. 12, the testing framework 1210 can include various components such as, for example, a calibration component 1212, an activate application component 1214, a synchronization component 1216, and/or one or more other components 1218.

As an example, the calibration component 1212 can provide for calibration of circuitry where, for example, contacts are made with a surface of a housing and vibration signals resulting from the contacts are associated with one or more regions of the surface of the housing, as may be performed by determining contact locations (e.g., source locations).

As an example, the activate application component 1214 can provide for activation of an application responsive to one or more contacts with a surface of a housing as can be determined at least in part via analysis of vibration signals.

As to the synchronization component 1216, it may provide for synchronization of one or more instances of an application executing on one or more computing devices. For example, consider a scenario 1250 where the multiple users 1255 can be utilizing respective computing devices 1254 that execute corresponding instances of an application that provides for output based at least in part on analysis of vibration signals resulting from physical contact between an object and a surface of a housing of each of the computing devices 1254. For example, consider a questionnaire that is timed and/or sequenced as to a number of questions. In such an example, the synchronization component 1216 may act to synchronize timers of the instances of the applications for the various computing devices 1254 such that input is expected within a certain period of time to the centralized computing system 1252.

As shown in the example of FIG. 12, the computing devices 1254 can be clamshell computing devices that are in a closed clamshell orientation such that the displays of the computing devices 1254 are not visible to the users 1255. While clamshell computing devices are mentioned, tablet form factor computing devices may be utilized where respective displays are facing downwardly such that they are not visible to the users 1255. In such examples, back side surfaces of display housings can be interacted with via user contact without any of the users 1255 being able to see a display or displays.

In the example of FIG. 12, the amount of devices in a testing facility may be minimized in that a user need not bring anything other than an appropriate computing device to provide answers to questions. For example, such an approach can supplant a need for clickers that are handed out to individuals such that they can make choices responsive to questions. Further, the approach of FIG. 12 can help to assure that any particular user does not have to handle a device of unknown sanitization. With respect to clickers, such clickers may be subject to physical contact by various individuals where sanitization (e.g., cleanliness, sterilization status, etc.) may not be guaranteed.

As mentioned, a computing device can provide feedback to a user via illumination. As explained, a computing device can include one or more LEDs or other light sources that can provide feedback responsive to a contact with a surface of a housing. As explained, a back side of a display housing can include an aperture that allows for illumination viewable to a user. For example, consider illumination that indicates a particular choice made by a user. In such an example, a LED may generate a particular color of light that indicates appropriate recognition of input as a response to a question where, for example, the color and/or other illumination (e.g., blinking, duration, etc.) may indicate a choice (e.g., T, F, A, B, C, D, etc.) as may be associated with a region where a contact location was determined to occur.

As the education space continues to adopt the use of technology and personal computing devices in classrooms and move away from paper worksheets and quizzes it can be more difficult to keep students focused on a task at hand while also ensuring academic integrity. As an example, the framework 1210 of FIG. 12 may be utilized in a classroom where students (e.g., users 1255) utilize their computing devices 1254 to submit answers where displays of their computing devices 1254 are not visible (e.g., closed clamshell computing devices, face down tablet computing devices, etc.). Such an approach can help to resolve various issues that may occur in a classroom during testing (e.g., distractions from screens, screen content, reduced demand for introducing specialized responders, etc.).

As explained, a laptop A cover (e.g., back side of a display housing) can provide regions that correspond to various options such as answer choices and/or one or more other actions. As to an example of another action, consider a region that can be utilized to raise a question to a proctor or teacher conducting an examination. In such an approach, the student can discretely communicate with the proctor or teacher to indicate that an issue may exist (e.g., a student is not feeling well, needs to take a break, did not understand an instruction, etc.). In such an example, a communication region may be at an edge of another region or separated sufficiently from another region to assure that a contact (e.g., a tap) in that region is not mistaken for an answer choice.

As an example, a framework such as the example framework 1210 can provide for taking attendance. For example, consider instructing students to tap a sequence such as A, C and B to indicate presence. In such an example, a computing device may transmit the sequence and, for example, an identifier such as, for example, a MAC address of the student's computing device. In such an example, the teacher can know that the student is present and know the specific computing device being used by the student (e.g., a MAC address as a unique identifier of a computing device).

The approach of FIG. 12 can be readily scalable such that a relatively large number of individuals may be present, provided ample networking equipment. The approach of FIG. 12 can allow a teacher to administer an attendance question or to quiz to large numbers of college students quickly or keep the focus of uninterested middle school students who tend to get easily distracted.

As shown in the example of FIG. 12, answers can be collected on the centralized computing system 1252, which may be a host computing system that can provide for communication with the computing device 1260, which can be securely accessed by a proctor, teacher, etc. As explained, an answer can be tagged with a submitter ID or simply aggregated in poll format to show distribution of answers. For example, a projector may be present or a large display that can render feedback in real-time or near real-time.

As explained, a method can include using one or more sensors (e.g., microphone(s), accelerometer(s), etc.) in a computing device to detect the location of taps on the A cover of the computing device (e.g., as a closed clamshell computing device). As explained, the A cover may be divided into a grid with 2, 3, 4 or more sections that then become an answer to a multiple choice question. The location of a user tap on the A cover can correspond to their answer selection that is then transmitted to a host to collect user inputs. These collected inputs could either be aggregated to answer a poll question or marked with a student ID as an official answer to the question that was asked. Such a method can be particularly useful in education settings as it can help to ensure students are not looking up answers or doing other work as a display of a computing device is not visible (e.g., not actuated, etc.). As mentioned, such an approach can readily scale from a small class with 5-10 students to large lectures with hundreds of participants.

As mentioned, one or more types of techniques may be utilized to locate a source (e.g., a contact from a tap, etc.). As explained, vibration signals can be utilized where one or more types of time of arrival, time difference, triangulation, etc., techniques may be applied to determine a source location that can be assigned a parameter (e.g., an answer, a call for assistance, etc.). In such an approach, parameters may be collected, for example, wirelessly via one or more networks where they can be assessed, for example, on an individual and/or group basis.

Figure 13:
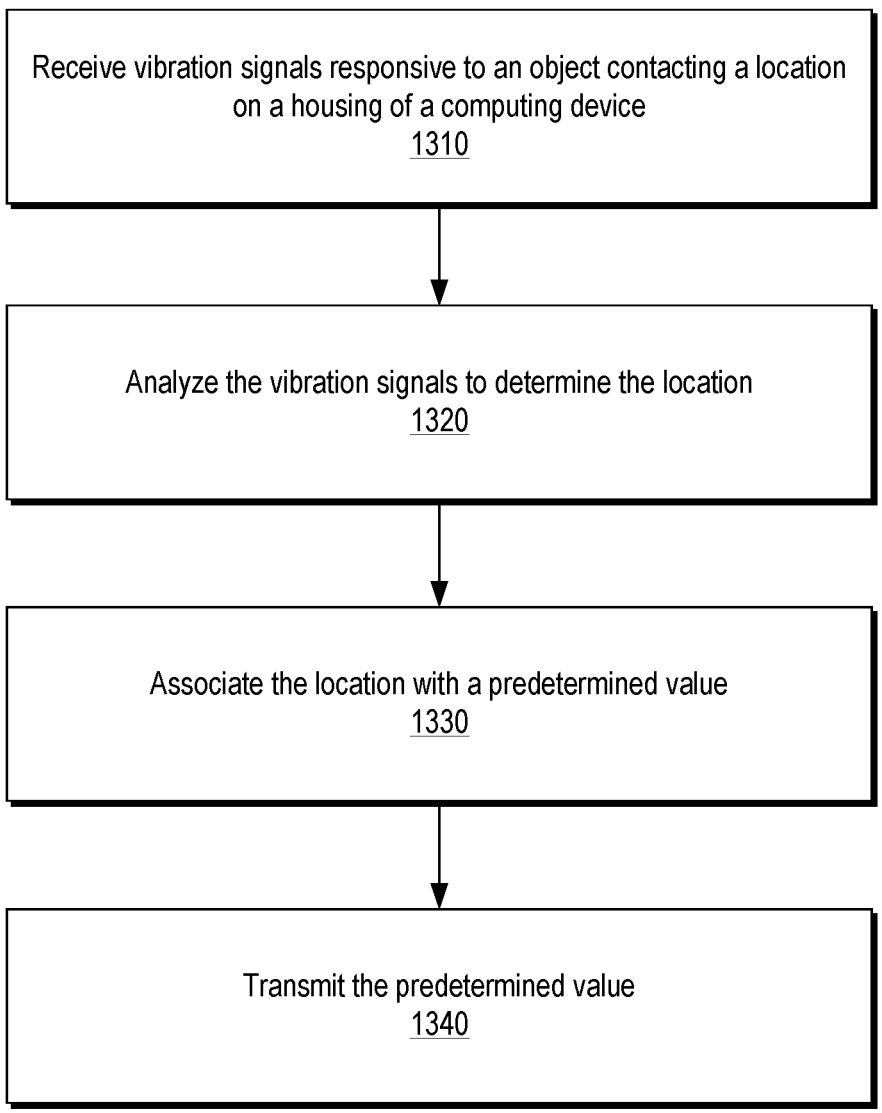
FIG. 13 is a diagram of an example of a method.

FIG. 13 shows an example of a method 1300 that includes a reception block 1310 for receiving vibration signals responsive to an object contacting a location on a housing of a computing device; an analysis block 1320 for analyzing the vibration signals to determine the location; and an association block 1330 for associating the location with a predetermined value; and a transmission block 1340 for transmitting the predetermined value.

Figure 14:
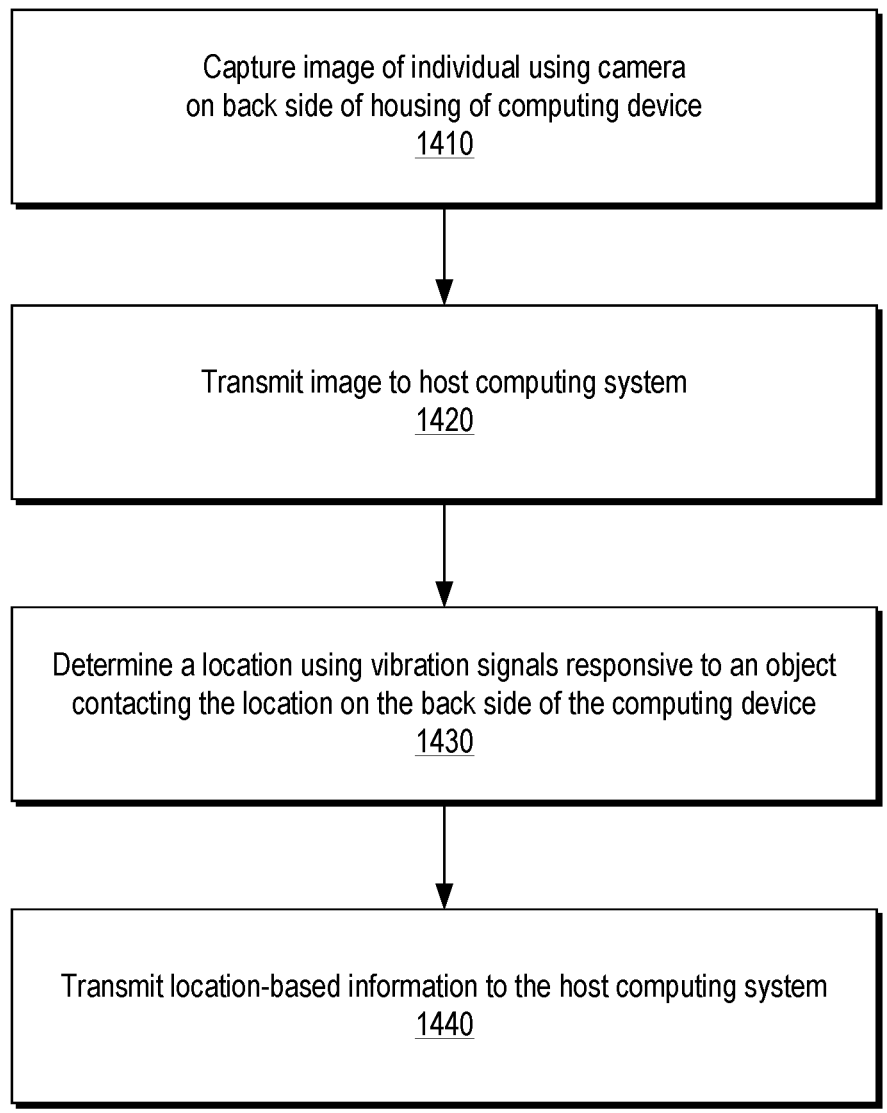
FIG. 14 is a diagram of an example of a method.

FIG. 14 shows an example of a method 1400 that includes a capture block 1410 for capturing an image of an individual using a camera on a back side of a housing of a computing device; a transmission block 1420 for transmitting the image to a host computing system; a determination block 1430 for determining a location using vibration signals responsive to an object contacting the location on the back side of the computing device; and a transmission block 1440 for transmitting location-based information to the host computing system.

In the example of FIG. 14, the host computing system can associate the location-based information with the captured image of the individual. In such an example, the computing device may also transmit an identifier such as, for example, a MAC address of the computing device. In such an example, the host computing system can receive information that identifies the individual and that identifies the computing device being utilized by the individual. Such information can help to assure integrity of a test (e.g., exam, questionnaire, etc.) that may be administered where answers are indicated via taping on the back side of the computing device (e.g., a surface on the back side of a display housing).

As an example, a method can include receiving vibration signals responsive to an object contacting a location on a housing of a computing device; analyzing the vibration signals to determine the location; associating the location with a predetermined value; and transmitting the predetermined value. In such an example, the vibration signals can include microphone signals and/or accelerometer signals. As an example, a motion sensor signal can be an accelerometer signal, which may be a gyroscope signal, etc. For example, a gyroscope can have some sensitivity to acceleration due to asymmetry of mechanical design and/or micromachining inaccuracies.

As an example, a method can include analyzing that includes utilizing time of arrival. In such an example, multiple times of arrival may be utilized for multiple sensors and/or for multiple types of waves (e.g., vibrational waves, etc.).

As an example, a method can include analyzing that includes utilizing cross correlation. For example, multiple signals can be processed using one or more cross correlation techniques.

As an example, a method can include issuing a notification signal via circuitry of a computing device where the notification signal is related to an object contacting a location on a housing of a computing device. In such an example, the circuitry can include LED circuitry and/or audio speaker circuitry.

As an example, a method can include calibrating a computing device to associate calibration vibration signals and locations on a housing of the computing device.

As an example, a method can include associating a location with a predetermined value by at least in part accessing a data structure that includes a plurality of predetermined values for a plurality of locations. In such an example, the plurality of predetermined values can correspond to test answer values. In such an example, the test answer values can include at least two different values and, for example, less than approximately twenty different values. For example, consider a surface that can be defined to include two different values, three different values, four different values, five different values, etc. As explained, a region of a surface may provide for calling for an action that is not a test answer action but rather, for example, a help action (e.g., for a request for assistance, to leave a room, etc.).

As an example, a location can be a grid location of a grid. In such an example, the grid can include two grid locations that include a true answer grid location and a false answer grid location. As an example, a grid can include at least four grid locations that include an A answer grid location, a B answer grid location, a C answer grid location and a D answer grid location.

As an example, a method can include receiving a plurality of predetermined values from a plurality of computing devices. In such an example, the plurality of the predetermined values can be analyzed to determine at least a number of correct responses to a question. For example, a group of test takers can make contacts with computing devices where each contact is associated with a predetermined value (e.g., a test taker answer choice) selected from a plurality of predetermined values (e.g., possible answer choices). In such an approach, the test taker answer choices can be transmitted to a host system (e.g., a host computing system, etc.) where one or more analyses may be performed to determine test scores of each user of a group and/or an entire group, etc.

As an example, a method can include receiving vibration signals where the vibration signals can be of a single type vibration signal or can be of multiple types of vibration signals. For example, consider multiple types of vibration signals as including accelerometer signals and microphone signals.

As mentioned, one or more other types of signals may be received such as, for example, one or more types of antenna signals. For example, consider at least one member selected from a group that includes WiFi antenna signals, digitizer antenna signals, NFC antenna signals, GPS antenna signals, and wireless power antenna signals. As an example, a method can include receiving at least one antenna signal indicative of presence of a human hand proximate to a housing of a computing device. In such an example, a range of proximity may be from approximately 20 cm to 0 cm (e.g., in contact with the housing). As an example, a maximum value for a range may be adjustable. For example, consider a maximum value that is less than 20 cm where a lesser maximum value can indicate with greater certainty that a human hand is proximate to a housing of a computing device where, for example, a determination may be made as to how close a human hand is to an antenna or antennas of a computing device. In such an example, an antenna signal or antenna signals may supplement information from one or more vibration signals.

As an example, a housing can be a display housing of a computing device. In such an example, the computing device can have a tablet form factor and/or can have a keyboard housing and a hinge assembly that couples the keyboard housing and the display housing. As an example, a convertible type of computing device may include a tablet portion that is detachable from another portion such as a keyboard portion. As an example, a convertible type of computing device may be convertible between a tablet form factor and a clamshell form factor.

As an example, a computing device can include a processor; memory accessible to the processor; wireless communication circuitry; a housing; a vibration sensor; and processor-executable instructions stored in the memory and executable by the processor to instruct the computing device to: receive vibration signals via the vibration sensor responsive to an object contacting a location on the housing; analyze the vibration signals to determine the location; associate the location with a predetermined value; and transmit the predetermined value via the wireless communication circuitry.

As an example, one or more computer-readable storage media can include computer-executable instructions executable to instruct a computing device to: receive vibration signals responsive to an object contacting a location on a housing of the computing device; analyze the vibration signals to determine the location; associate the location with a predetermined value; and transmit the predetermined value.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 15:
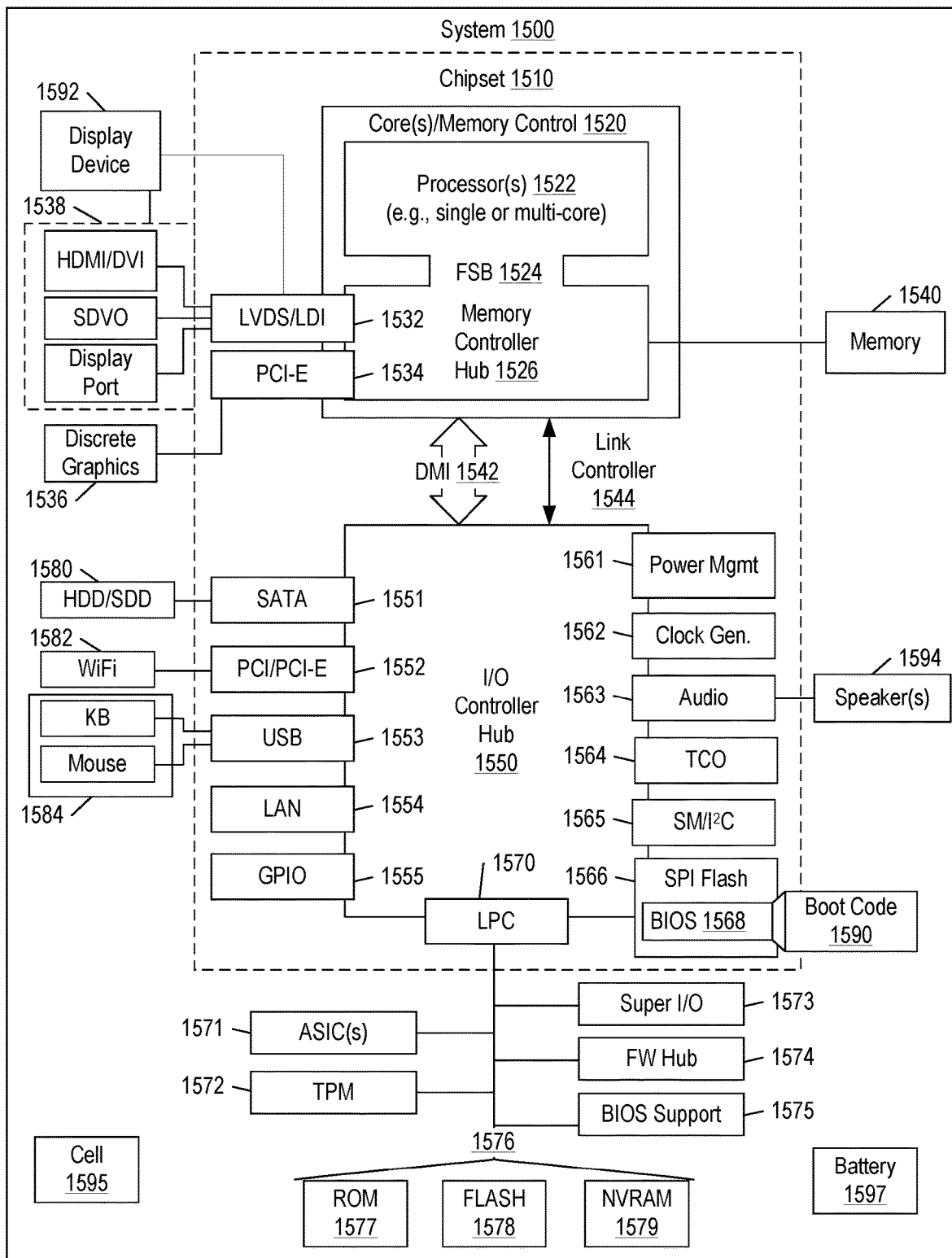
FIG. 15 is a diagram of an example of a system that includes one or more processors.

While various examples of circuits or circuitry have been discussed, FIG. 15 depicts a block diagram of an illustrative computer system 1500. The system 1500 may be a computer system, such as one of the ThinkCentre® or ThinkPad® series of personal computers sold by Lenovo (US) Inc. of Morrisville, NC, or a workstation computer system, such as the ThinkStation®, which are sold by Lenovo (US) Inc. of Morrisville, NC; however, as apparent from the description herein, a system or other machine may include other features or only some of the features of the system 1500. As an example, a device such as the device 100 of FIG. 1, the device 200 of FIG. 2, etc., may include at least some of the features of the system 1500.

As shown in FIG. 15, the system 1500 includes a so-called chipset 1510. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 15, the chipset 1510 has a particular architecture, which may vary to some extent depending on brand or manufacturer. The architecture of the chipset 1510 includes a core and memory control group 1520 and an I/O controller hub 1550 that exchange information (e.g., data, signals, commands, etc.) via, for example, a direct management interface or direct media interface (DMI) 1542 or a link controller 1544. In the example of FIG. 15, the DMI 1542 is a chip-to-chip interface (sometimes referred to as being a link between a "northbridge" and a "southbridge").

The core and memory control group 1520 include one or more processors 1522 (e.g., single core or multi-core) and a memory controller hub 1526 that exchange information via a front side bus (FSB) 1524. As described herein, various components of the core and memory control group 1520 may be integrated onto a single processor die, for example, to make a chip that supplants the conventional "northbridge" style architecture.

The memory controller hub 1526 interfaces with memory 1540. For example, the memory controller hub 1526 may provide support for DDR SDRAM memory (e.g., DDR, DDR2, DDR3, etc.). In general, the memory 1540 is a type of random-access memory (RAM). It is often referred to as "system memory".

The memory controller hub 1526 further includes a low-voltage differential signaling interface (LVDS) 1532. The LVDS 1532 may be a so-called LVDS Display Interface (LDI) for support of a display device 1592 (e.g., a CRT, a flat panel, a projector, etc.). A block 1538 includes some examples of technologies that may be supported via the LVDS interface 1532 (e.g., serial digital video, HDMI/DVI, display port). The memory controller hub 1526 also includes one or more PCI-express interfaces (PCI-E) 1534, for example, for support of discrete graphics 1536. Discrete graphics using a PCI-E interface has become an alternative approach to an accelerated graphics port (AGP). For example, the memory controller hub 1526 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1550 includes a variety of interfaces. The example of FIG. 15 includes a SATA interface 1551, one or more PCI-E interfaces 1552 (optionally one or more legacy PCI interfaces), one or more USB interfaces 1553, a LAN interface 1554 (more generally a network interface), a general purpose I/O interface (GPIO) 1555, a low-pin count (LPC) interface 1570, a power management interface 1561, a clock generator interface 1562, an audio interface 1563 (e.g., for speakers 1594), a total cost of operation (TCO) interface 1564, a system management bus interface (e.g., a multi-master serial computer bus interface) 1565, and a serial peripheral flash memory/controller interface (SPI Flash) 1566, which, in the example of FIG. 15, includes BIOS 1568 and boot code 1590. With respect to network connections, the I/O hub controller 1550 may include integrated gigabit Ethernet controller lines multiplexed with a PCI-E interface port. Other network features may operate independent of a PCI-E interface.

The interfaces of the I/O hub controller 1550 provide for communication with various devices, networks, etc. For example, the SATA interface 1551 provides for reading, writing or reading and writing information on one or more drives 1580 such as HDDs, SDDs or a combination thereof. The I/O hub controller 1550 may also include an advanced host controller interface (AHCI) to support one or more drives 1580. The PCI-E interface 1552 allows for wireless connections 1582 to devices, networks, etc. The USB interface 1553 provides for input devices 1584 such as keyboards (KB), one or more optical sensors, mice and various other devices (e.g., microphones, cameras, phones, storage, media players, etc.). On or more other types of sensors may optionally rely on the USB interface 1553 or another interface (e.g., I²C, etc.). As to microphones, the system 1500 of FIG. 15 may include hardware (e.g., audio card) appropriately configured for receipt of sound (e.g., user voice, ambient sound, tapping sound, etc.).

In the example of FIG. 15, the LPC interface 1570 provides for use of one or more ASICs 1571, a trusted platform module (TPM) 1572, a super I/O 1573, a firmware hub 1574, BIOS support 1575 as well as various types of memory 1576 such as ROM 1577, Flash 1578, and non-volatile RAM (NVRAM) 1579. With respect to the TPM 1572, this module may be in the form of a chip that can be used to authenticate software and hardware devices. For example, a TPM may be capable of performing platform authentication and may be used to verify that a system seeking access is the expected system.

The system 1500, upon power on, may be configured to execute boot code 1590 for the BIOS 1568, as stored within the SPI Flash 1566, and thereafter processes data under the control of one or more operating systems and application software (e.g., stored in system memory 1540). An operating system may be stored in any of a variety of locations and accessed, for example, according to instructions of the BIOS 1568. Again, as described herein, a satellite, a base, a server or other machine may include fewer or more features than shown in the system 1500 of FIG. 15. Further, the system 1500 of FIG. 15 is shown as optionally include cell phone circuitry 1595, which may include GSM, CDMA, etc., types of circuitry configured for coordinated operation with one or more of the other features of the system 1500. Also shown in FIG. 15 is battery circuitry 1597, which may provide one or more battery, power, etc., associated features (e.g., optionally to instruct one or more other components of the system 1500). As an example, a SMBus may be operable via a LPC (see, e.g., the LPC interface 1570), via an I²C interface (see, e.g., the SM/I²C interface 1565), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
   receiving vibration signals responsive to an object contacting a location on a housing of a computing device;
   analyzing the vibration signals to determine the location;
   associating the location with a predetermined value as a response to a question; and
   transmitting the predetermined value via wireless communication circuitry of the computing device for compiling a plurality of the predetermined values from a number of the computing devices to determine at least a number of correct responses to the question.

2. The method of claim 1, wherein the vibration signals comprise microphone signals.

3. The method of claim 1, wherein the vibration signals comprise accelerometer signals.

4. The method of claim 1, wherein the analyzing comprises utilizing time of arrival.

5. The method of claim 1, wherein the analyzing comprises utilizing cross correlation.

6. The method of claim 1, comprising issuing a notification signal via circuitry of the computing device.

7. The method of claim 6, wherein the circuitry comprises LED circuitry.

8. The method of claim 6, wherein the circuitry comprise audio speaker circuitry.

9. The method of claim 1, comprising calibrating the computing device to associate calibration vibration signals and locations on the housing.

10. The method of claim 1, wherein the associating comprises accessing a data structure that comprises a plurality of predetermined values for a plurality of locations.

11. The method of claim 10, wherein the plurality of predetermined values corresponds to test answer values.

12. The method of claim 1, wherein the location comprises a grid location of a grid.

13. The method of claim 1, comprising receiving, by the computing device, a plurality of the predetermined values from a plurality of computing devices.

14. The method of claim 13, comprising compiling the plurality of the predetermined values to determine the at least a number of correct responses to the question.

15. The method of claim 1, wherein the receiving vibration signals comprises receiving multiple types of vibration signals.

16. The method of claim 15, wherein the multiple types of vibration signals comprise accelerometer signals and microphone signals.

17. The method of claim 1, comprising receiving at least one antenna signal indicative of presence of a human hand proximate to the housing of the computing device.

18. The method of claim 1, wherein the housing comprises a display housing of the computing device.

19. A computing device comprising:
   a processor;
   memory accessible to the processor;
   wireless communication circuitry;
   a housing;
   a vibration sensor;
   and processor-executable instructions stored in the memory and executable by the processor to instruct the computing device to:
     receive vibration signals via the vibration sensor responsive to an object contacting a location on the housing;
     analyze the vibration signals to determine the location;
     associate the location with a predetermined value as a response to a question; and
     transmit the predetermined value via the wireless communication circuitry for compiling a plurality of the predetermined values from a number of the computing devices to determine at least a number of correct responses to the question.

20. One or more computer-readable storage media comprising computer-executable instructions executable to instruct a computing device to:
   receive vibration signals responsive to an object contacting a location on a housing of the computing device;
   analyze the vibration signals to determine the location;
   associate the location with a predetermined value as a response to a question; and
   transmit the predetermined value via wireless communication circuitry of the computing device for compiling a plurality of the predetermined values from a number of the computing devices to determine at least a number of correct responses to the question.

* * * * *